(12) United States Patent
Lee et al.

(10) Patent No.: US 7,349,058 B2
(45) Date of Patent: Mar. 25, 2008

(54) METHOD OF MANUFACTURING A LIQUID CRYSTAL DISPLAY DEVICE COMPRISING FORMING A PLURALITY OF SPACERS HAVING COMPRESSION RATIOS GRADUALLY INCREASING AS ADVANCING FROM A CENTER TO LEFT AND RIGHT EDGES OF DISPLAY REGION

(75) Inventors: Woo-Shik Lee, Seoul (KR); Gi-Chun Yoo, Suwon-si (KR); Baek-Kyun Jeon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/765,743

(22) Filed: Jun. 20, 2007

(65) Prior Publication Data

US 2007/0258034 A1 Nov. 8, 2007

Related U.S. Application Data

(62) Division of application No. 10/643,934, filed on Aug. 20, 2003, now Pat. No. 7,253,868.

(30) Foreign Application Priority Data

| Aug. 21, 2002 | (KR) | ................................. 2002-49576 |
| Oct. 4, 2002 | (KR) | ................................. 2002-60498 |
| Oct. 30, 2002 | (KR) | ................................. 2002-66617 |

(51) Int. Cl.
*G02F 1/1339* (2006.01)

(52) U.S. Cl. ....................................................... 349/155

(58) Field of Classification Search ................ 349/155, 349/187, 189, 190, 156, 106, 110
See application file for complete search history.

(56) References Cited

U.S. PATENT DOCUMENTS 6,184,967 B1 * 2/2001 Lagerwall et al. .......... 349/155

\* cited by examiner

*Primary Examiner*—Thoi V. Duong
(74) *Attorney, Agent, or Firm*—F. Chau & Associates, LLC

(57) ABSTRACT

A liquid crystal display apparatus includes first and second substrates, a fence, a liquid crystal layer and a plurality of spacers. The first substrate includes a display region for displaying an image. The second substrate faces the first substrate. The fence is disposed between the first substrate and the second substrate. The fence surrounds the display. The spacers maintain the distance between the first and second substrates. The spacers have a gradually increasing compression ratio in a direction from a center of the display region to an edge of the display region. The liquid crystal display apparatus maintains a uniform cell gap, even though a compressive stress of a center portion of the liquid crystal display apparatus is different with a compressive stress of an edge portion of the liquid crystal display apparatus. Therefore, display quality is enhanced.

15 Claims, 32 Drawing Sheets

METHOD OF MANUFACTURING A LIQUID CRYSTAL DISPLAY DEVICE COMPRISING FORMING A PLURALITY OF SPACERS HAVING COMPRESSION RATIOS GRADUALLY INCREASING AS ADVANCING FROM A CENTER TO LEFT AND RIGHT EDGES OF DISPLAY REGION

CROSS-REFERENCE TO RELATED APPLICATIONS

This application is a divisional of U.S. application Ser. No. 10/643,934 filed on Aug. 20, 2003, now U.S. Pat. No. 7,253,868 which claims priority under 35 U.S.C. §119 to Korean Patent Application No. 2002-49576 filed on Aug. 21, 2002, Korean Patent Application No. 2002-60498 filed on Oct. 4, 2002 and Korean Patent Application No. 2002-66617 filed on Oct. 30, 2002, the disclosures of which are all incorporated by reference herein in their entirety.

BACKGROUND OF THE INVENTION

1. Field of the Invention

The present invention relates to a substrate that is used for a liquid crystal display device, a liquid crystal display device having the substrate and a method of manufacturing the liquid crystal display device, and more particularly to a substrate that maintains a uniform cell gap in spite of self-weight, a liquid crystal display device having no unfilled-region, and a manufacturing the liquid crystal display device preventing the overflow of the liquid crystal molecules.

2. Description of the Related Art

Generally, a liquid crystal display device includes a thin film transistor substrate, a color filter substrate and a liquid crystal layer interposed between the thin film transistor and the color filter substrate.

When a thickness of the liquid crystal layer (or a cell gap between the thin film transistor substrate and the color filter substrate) is non-uniform, a display quality of the liquid crystal display device is deteriorated.

A spacer is interposed between the thin film transistor substrate and the color filter substrate, so as to maintain the cell gap between the thin film transistor substrate and the color filter substrate.

The spacer has a spherical shape or a column-shape. The spacer that has a spherical shape is referred to as a ball spacer. The spacer that has a column-shape is referred to as a rigid spacer.

A diameter of the ball spacer is only a few μm. The ball spacer is scattered on the color filter substrate or on the thin film transistor substrate.

The ball spacer has demerits as follows.

Firstly, the ball spacer is deformable and scattered irregularly, so that the cell gap is not uniform. Secondly, a liquid crystal molecule near the ball spacer is abnormally arranged to lower a luminance. Thirdly, reducing the diameter of the ball spacer is very hard, so that making a short cell gap is also very hard. Fourthly, the ball spacer may be disposed on a pixel to deteriorate a display quality.

A photoresist formed on the thin film transistor substrate or on the color filter substrate is etched to form the rigid substrate. Thus, the rigid substrate may be formed in a region between the pixels, so that the display quality is not deteriorated. Further, the photoresist may have a thin thickness. Thus, the cell gap may be reduced.

However, when a different compression is applied depending on regions, the cell gap is different according to the regions.

For example, when the thin film transistor substrate is over the color filter substrate with reference to a gravitational force, the thin film transistor substrate sags due to an atmospheric pressure and a self-weight of the thin film transistor substrate.

FIG. 1 is a graph showing a relation between a cell gap and a position of a thin film transistor substrate, when a general rigid spacer is used.

A point 'A' represents a position near a first edge of a thin film transistor substrate. A point 'B' represents a center position of the thin film transistor substrate. A point 'C' represents a position near a second edge that is opposite to the first edge of the thin film transistor substrate.

Referring to FIG. 1, a cell gap at the center position 'B' of the thin film transistor is minimum, and the cell gap increases in a direction from the center position 'B' to the edge position 'C'. That is, because compression is maximum at the center due to a self-weight of the thin film transistor substrate.

Thus, a rigid spacer formed at the center 'B' is compressed more than a rigid spacer formed at the edges 'A' and 'C', so that the rigid spacer formed at the center 'B' or the center portion of the color filter substrate and the thin film transistor substrate may be damaged.

Recently, as a liquid crystal display apparatus becomes larger, a method of filling the liquid crystal is changed from a vacuum injection method into a drop and filling method.

In the drop and filling method, liquid crystal material is dropped on the color filter substrate having a spacer formed thereon. Then, the color filter substrate and the thin film transistor substrate are assembled with each other.

The drop and filling method is simple in comparison with the vacuum injection method. However, a liquid crystal display apparatus manufactured by the drop and filling method may include an unfilled region where the liquid crystal is not completely filled, or the liquid crystal material may overflow, when the liquid crystal material is too much.

In detail, when the liquid crystal material is provided too much, the liquid crystal material overflows, so that the thin film transistor substrate and the color filter substrate are not completely assembled. When the liquid crystal material is provided insufficiently, the liquid crystal display apparatus includes the unfilled region.

The unfilled region deteriorates a display quality of the liquid crystal display apparatus.

Due to these problems, a vacuum injection method is used in spite of complexity of procedure and much consumption of liquid crystal material.

However, as the liquid crystal display apparatus becomes larger, the vacuum injection method meets a limit. Thus, the drop and filling method has been developed.

In the drop and filling method, the amount of the spacer and the liquid crystal material is important.

SUMMARY OF THE INVENTION

Accordingly, the present invention is provided to substantially obviate one or more problems due to limitations and disadvantages of the related art.

It is a feature of the present invention to provide a substrate for liquid crystal display apparatus.

In one aspect of the present invention, a liquid crystal display apparatus having the substrate is provided.

In another aspect of the present invention, a method of manufacturing a liquid crystal display apparatus is provided.

According to the substrate of this invention, the substrate includes a transparent substrate and a plurality of spacers. The transparent substrate includes a display region for displaying an image. The spacers are formed in the display region. The spacers have a gradually increasing compression ratio in a direction from a center of the display region to an edge of the display region.

The liquid crystal display apparatus includes a first substrate, a second substrate, a fence, a liquid crystal layer and a plurality of spacers. The first substrate includes a display region for displaying an image. The second substrate faces the first substrate. The fence is disposed between the first substrate and the second substrate. The fence surrounds the display region to form a space defined by the first and the second substrates and the fence. The liquid crystal layer is disposed in the space. The spacers are disposed in the space. The spacers maintain the distance between the first and second substrates. The spacers have a gradually increasing compression ratio in a direction from a center of the display region to an edge of the display region.

According to the method of manufacturing the liquid crystal display apparatus, a first substrate including a display region for displaying an image is formed. A second substrate is formed. A plurality of spacers is formed on the display region of the first substrate. The spacers have a gradually increasing compression ratio in a direction from a center of the display region to an edge of the display region. A fence is formed on the first substrate, such that the fence surrounds the display region to form a space defined by the first substrate and the fence. Liquid crystal is dropped in the space to fill the space. Then, the first and second substrates are assembled with each other.

According to another method of manufacturing the liquid crystal display apparatus, a first substrate including a display region for displaying an image is formed. A second substrate is formed. A density and a cross-sectional area of spacers are calculated from a comparative liquid crystal display panel. Then, the spacers according to the calculated density and the cross-sectional area are formed on the first substrate. A fence is formed on the first substrate, such that the fence surrounds the display region to form a space defined by the first substrate and the fence. Liquid crystal is dropped in the space to fill the space. Then, the first and second substrates are assembled with each other.

The liquid crystal display apparatus maintains a uniform cell gap, even though a compressive stress of a center portion of the liquid crystal display apparatus is different from a compressive stress of an edge portion of the liquid crystal display apparatus. Therefore, display quality is enhanced.

According to the method of manufacturing a liquid crystal display apparatus, the density and the cross-sectional area are adjusted, so that an unfilled region where the liquid crystal is not filled is not formed. Thus, the display quality is also enhanced. Further, the first and second substrates are not damaged while assembling the first and second substrates.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE PREFERRED EMBODIMENTS

Hereinafter the preferred embodiments of the present invention will be described in detail with reference to the accompanying drawings.

Embodiment 1

Figure 1:
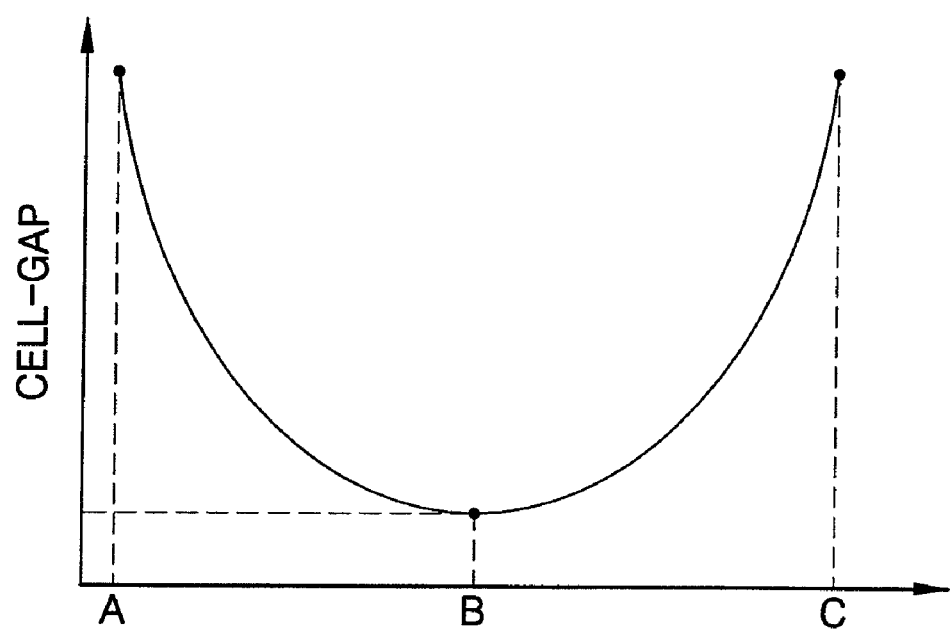
FIG. 1 is a graph showing a relation between a cell gap and a position of a thin film transistor substrate, when a general rigid spacer is used.
Figure 2:
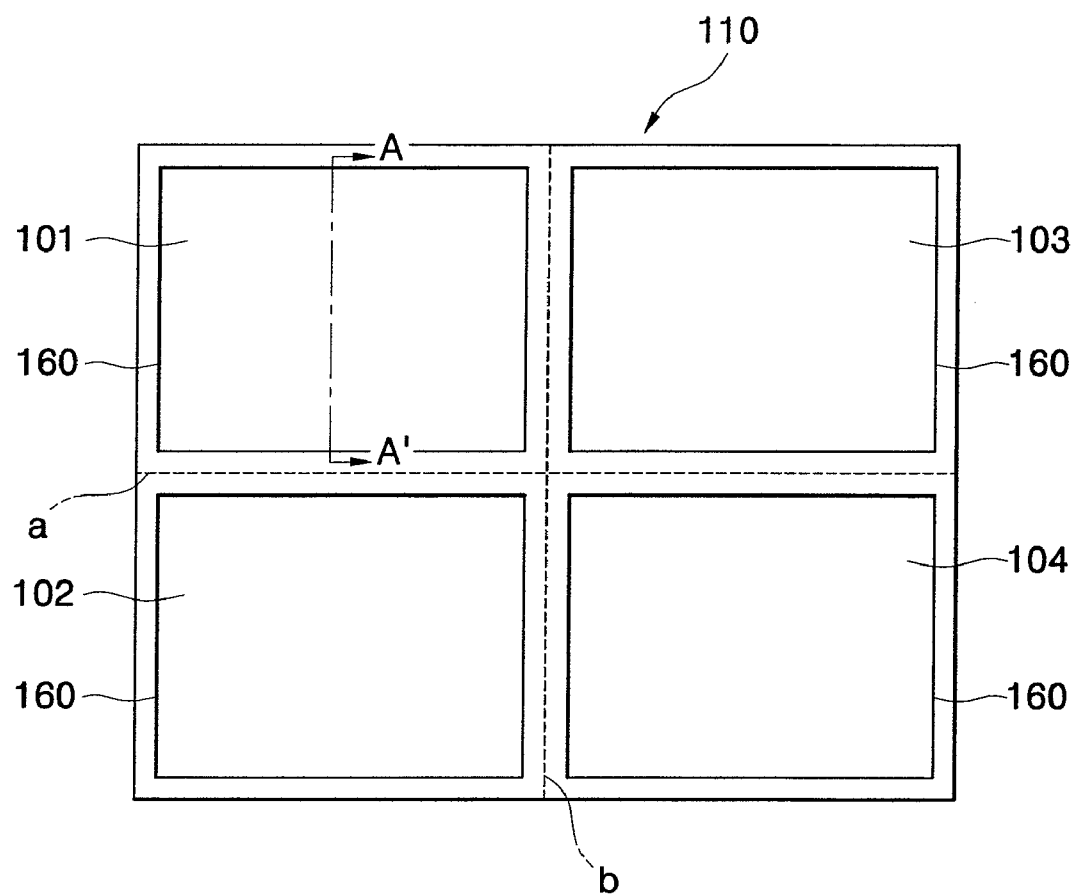
FIG. 2 is a schematic plan view showing a mother substrate of liquid crystal display panel according to a first exemplary embodiment.
Figure 3:
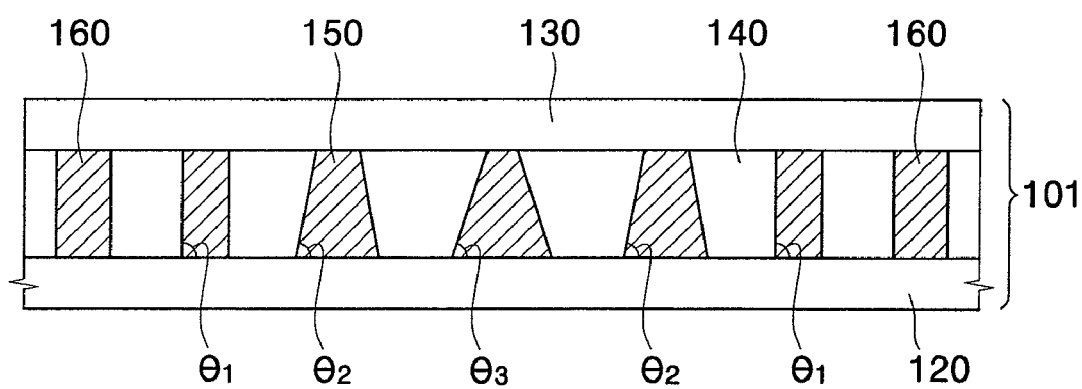
FIG. 3 is a cross-sectional view taken along a line A-A' of FIG. 2.

FIG. 2 is a schematic plan view showing a mother substrate of liquid crystal display panel according to a first exemplary embodiment, and FIG. 3 is a cross-sectional view taken along a line A-A' of FIG. 2.

Referring to FIGS. 2 and 3, a mother substrate 110 of a liquid crystal display panel includes a plurality of liquid crystal display panels 101, 102, 103 and 104.

The mother substrate 110 includes two substrates 120 and 130, and a liquid crystal layer interposed between the two substrates 120 and 130. Each of the liquid crystal display panels 101, 102, 103 and 104 includes a display region.

A plurality of spacers 150 is formed between the two substrates 110 and 120. The spacers 150 maintain a cell gap that is a distance between the two substrates 110 and 120.

The liquid crystal layer 140 is confined within a space defined by the two substrates 110 and 120, and a fence 160.

As shown in FIG. 3, the spaces 150 have different tapered angles θ1, θ2 and θ3 from each other.

The tapered angle θ3 of a spacer 150 disposed at a center portion is the least. The tapered angle of the spaces 150 increases in a direction from the center portion to an edge portion of each of the liquid crystal display panels 101, 102, 103 and 104.

A compression ratio of the spacers 150 is inversely proportional to a value that is obtained by multiplying an upper diameter by a lower diameter of the spacer 150. Thus, the value obtained by multiplying the upper diameter by the lower diameter of the spacer 150 that is disposed at the center is larger than that of the spacer 150 that is disposed at the edge of the liquid crystal display panel, so that the compression ratio of the spacers 150 becomes larger in a direction from the center to the edge.

Thus, the cell gap of the center is substantially equal to the cell gap of the edge, even though the compression at the center is large due to the self-weight.

The fence 160 may be used as a spacer 150 that maintains the cell gap between the two substrates 120 and 130.

Embodiment 2

Figure 4:
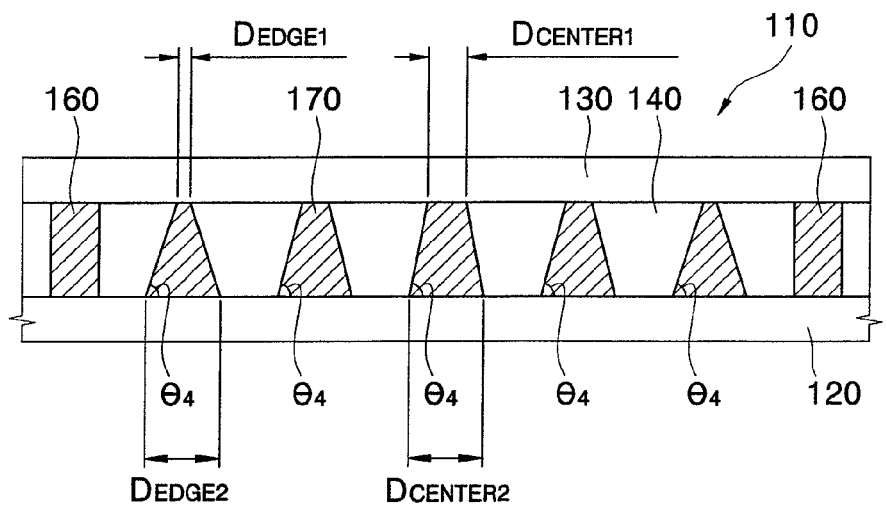
FIG. 4 is a cross-sectional view showing a liquid crystal display apparatus according to a second exemplary embodiment.

FIG. 4 is a cross-sectional view showing a liquid crystal display apparatus according to a second exemplary embodiment.

The liquid crystal display apparatus of the present embodiment is similar to the liquid crystal display apparatus of Embodiment except that a shape of the spaces is different from that of Embodiment 1. Thus, in FIG. 4, the same reference numbers will be used to refer to the same or like parts as those shown in FIG. 3.

Referring to FIGS. 2 and 4, spacers 170 support the two substrates 120 and 130. A diameter of the spacers 170 becomes smaller in a direction from the center to the edge, so that a compression ratio becomes larger in the direction.

In other word, an area of a contact face between the spacers 170 and the two substrates 120 and 130 becomes smaller in a direction from the center to the edge.

Thus, the cell gap of the center is substantially equal to the cell gap of the edge, even though the compression at the center is large due to the self-weight.

In FIG. 4, tapered angles of the spacers 170 are the same. However, the tapered angles may be different from each other.

Referring again to FIGS. 3 and 4, a compressed amount δ of the spacers 150 or 170 is inversely proportional to a value that is obtained by multiplying an upper diameter D1 by a lower diameter D2 of the spacer 150 or 170, as shown in the following Expression 1.

$$\delta = \int_0^{L_0} \varepsilon_L dL = \frac{4P}{\pi E} \int_0^{L_0} \frac{1}{(D_1 + 2L\tan\theta)^2} dL \qquad \text{Expression 1}$$
$$= \frac{4P}{\pi E} \left[ -\frac{1}{(2\tan\theta)} \times \frac{1}{(D_1 + 2L\tan\theta)} \right]_0^{L_0}$$
$$= \frac{2P}{\pi E \tan\theta} \left[ \frac{1}{D_1} - \frac{1}{(D_1 + 2L_0\tan\theta)} \right]$$

-continued $$= \frac{4P}{\pi E} \frac{L_0}{D_1(D_1 + 2L\tan\theta)}$$

$$\therefore \delta = \frac{4PL_0}{\pi E D_1 D_2}, \left(\tan\theta = \frac{D_2 - D_1}{2L_0}\right),$$

wherein 'P' denotes a compressive stress, '$L_0$' denotes a length (or height) of the spacer 150 or 170, and 'E' denotes Young's modulus.

The compressed amount $\delta_{edge}$ of the spacers disposed at the edge is larger than the compressed amount $\delta_{center}$ of the spacers disposed at the center so as to maintain a uniform cell gap ($\delta_{edge} < \delta_{center} + 0.1$).

The compressed amount $\delta_{center}$ is larger than compressed amount $\delta_{edge}$ by about 0.1 µm. Thus, when $\delta_{edge}$ is smaller than $\delta_{center} + 0.1$ ($\delta_{edge} < \delta_{center} + 0.1$), the cell gap is maintained uniformly.

Thus, the following Expression 2 is induced.

$$1 < (D_{center1} \times D_{center2})/(D_{edge1} \times D_{edge2}) < 1 + 0.1 \quad (D_{center1} \times D_{center2}) \qquad \text{Expression 2}$$

wherein $D_{center1}$ and $D_{center2}$ represent respectively upper and lower diameters of the spacer of the center, and $D_{edge1} \times D_{edge2}$ represent respectively upper and lower diameters of the spacer of the edge.

The multiplication of the diameters is directly proportional to the area of a contact face between the spacers 150 or 170 and the two substrates 120 or 130. Thus, the Expression 3 may be induced from the Expression 2.

$$1 < A_{center}/A_{edge} < 1 + 0.1 A_{center} \qquad \text{Expression 3}$$

wherein $A_{center}$ denotes an area of contact face between the substrates and the spacer 150 or 170 disposed at the center, and $A_{edge}$ denotes an area of contact face between the substrates and the spacer 150 or 170 disposed at the edge.

Thus, when a spacer satisfies Expression 2 or Expression 3, the cell gap is maintained uniformly, even though different compressive stress may be applied depending the region.

Embodiment 3

Figure 5:
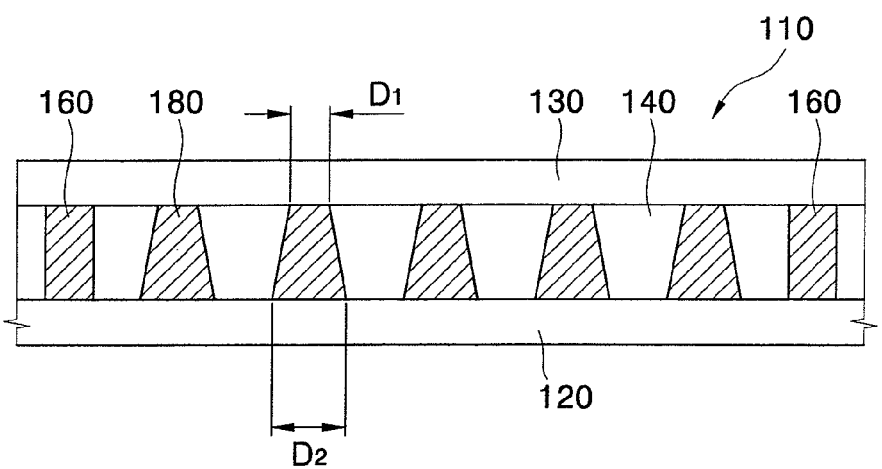
FIG. 5 is a cross-sectional view showing a liquid crystal display apparatus according to a third exemplary embodiment.

FIG. 5 is a cross-sectional view showing a liquid crystal display apparatus according to a third exemplary embodiment.

Referring to FIG. 5, each of spacers 180 has a same shape. However, a compression ratio of the spacers 180 is different from each other.

The spacers 180 have different polymer linking density. That is, the polymer linking density of the spacer 180 disposed at the center of the liquid crystal display panel is higher than that of the spacer 180 disposed at the edge.

The polymer linking density of the spacer 180 becomes higher in a direction from the center to the edge of the liquid crystal panel.

In order to adjust the polymer linking density of the spacer 180, energy of exposure process is modulated. The spacers 180 are formed through a photolithography process. That is, a photoresist is coated on a first substrate 120 or on a second substrate 130. Then, the photoresist is exposed with a mask disposed over the photoresist, and developed, so that the spacers 180 are formed. As the photoresist is exposed to a light having higher energy, the polymer linking density of the spacer 180 becomes higher. Thus, energy of the light becomes lower in a direction from the center to the edge, so that the polymer linking density of the spacers 180 becomes lower in the direction.

The spacer 180 disposed at the edge is more compressive than the spacer 180 disposed at the center, so that the uniform cell gap is maintained, even though a compressive force of the center is stronger than that of the edge due to the self-weight.

Figure 6:
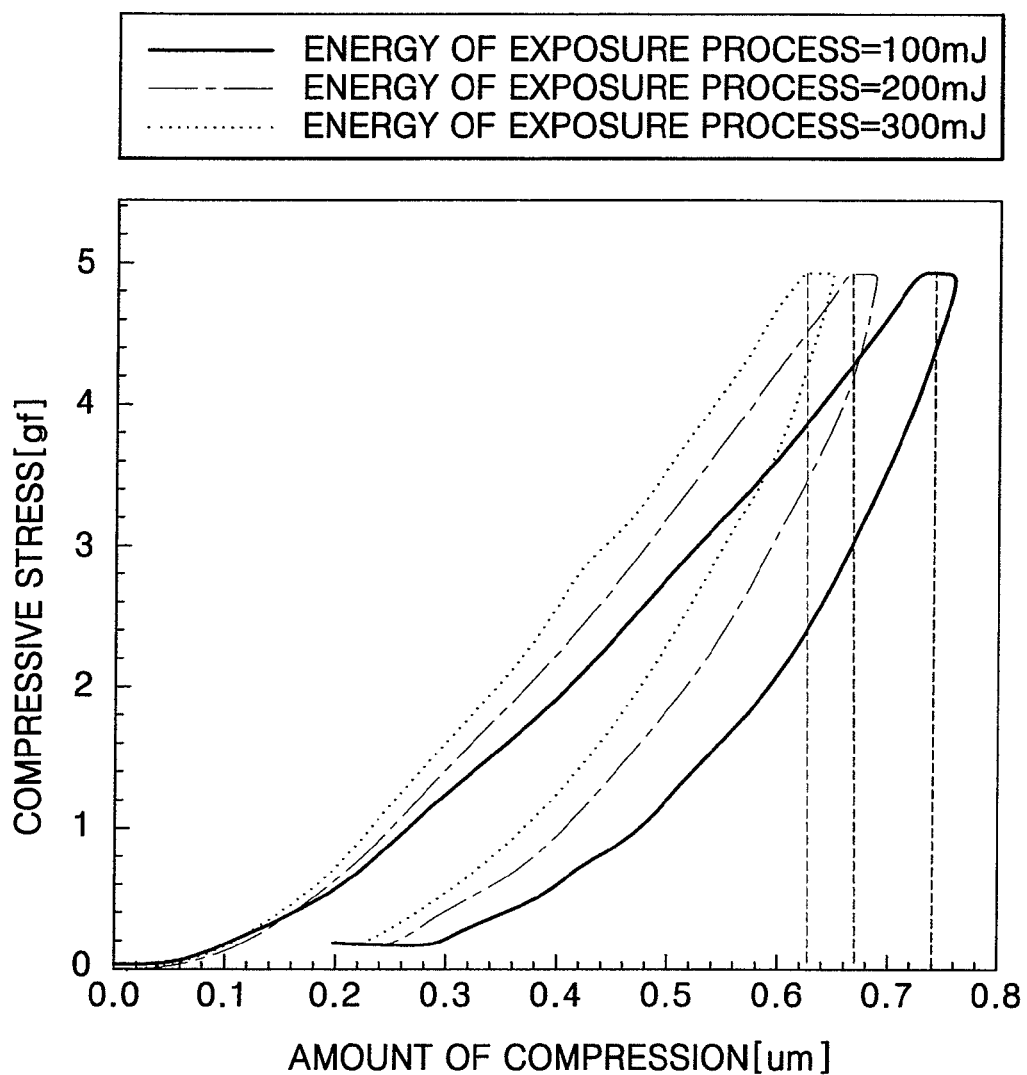
FIG. 6 is a graph showing a relation between a compressive stress and an amount of compression for different energy of exposure process is applied.

FIG. 6 is a graph showing a relation between a compressive stress and an amount of compression for different energy of exposure process is applied.

In a simulation, a cylindrical shaped spacer has a height of about 4.5 µm and a diameter of about 2.5 µm.

As shown in the FIG. 6, as the compressive stress increases, an amount of compression increases. As energy of exposure process increases, the amount of compression decreases. That is, when the energy of exposure process increases, the spacers become stiffer.

The graph of compressive stress and the amount of compression is a hysteresis curve.

When the energy of exposure process is about 100 mJ, the amount of compression that corresponds to 5 gf compressive stress is about 0.746 µm. When the energy of exposure process is about 300 mJ, the amount of compression that corresponds to 5 gf compressive stress is about 0.62 µm. A difference in the amount of compression is about 0.13 µm. The energy difference of light of the center and the edge does not exceed about 200 mJ.

Figure 7:
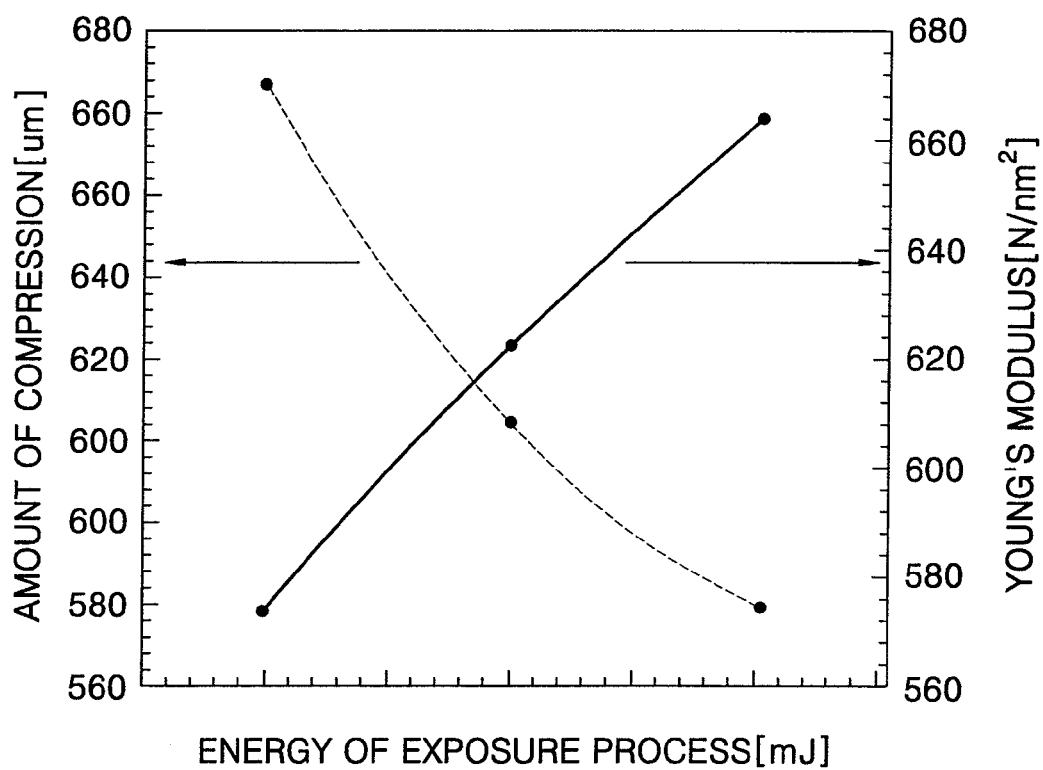
FIG. 7 is a graph showing a relation between energy of exposure process and an amount of compression (or Young's modulus)

FIG. 7 is a graph showing a relation between energy of exposure process and an amount of compression (or Young's modulus).

Young's modulus is a compressive stress per a cross-sectional area of the spacer. Various elements change Young's modulus. In FIG. 7, the energy of exposure process is the element that changes Young's modulus.

As shown in FIG. 7, as the energy of exposure process becomes larger, Young's modulus becomes larger and the amount of compression becomes smaller.

Thus, in order to maintain a uniform cell gap, forming a spacer of the center needs light that has much energy than that of the edge.

Preferably, Young's modulus between the spacer of the center and the spacer of the edge does not exceed about 100 N/mm$^2$.

Referring again to FIGS. 2 and 5, a liquid crystal layer 140 may be formed before or after separating the liquid crystal panels 101, 102, 103 and 104 from the mother substrate 110.

Liquid crystal material may be injected between the first substrate 120 and the second substrate 130 via vacuum injection, after the liquid crystal panels 101, 102, 103 and 104 are separated from the mother substrate 110 according to dotted lines 'a' and 'b'.

The liquid crystal material may be dropped on the first substrate 120 or the second substrate 130, and the first and second substrates 120 and 130 are assembled, before the liquid crystal panels 101, 102, 103 and 104 are separated from the mother substrate 110.

The first substrate 120 corresponds to an array substrate (or thin film transistor substrate). The second substrate 130 corresponds to a color filter substrate.

The array substrate includes a gate line, a date line, a thin film transistor and a pixel electrode. The thin film transistor includes a gate electrode, a drain electrode and a source electrode. The gate electrode is electrically connected with the gate line. The source electrode is electrically connected with the data line. The drain electrode is electrically connected with the pixel electrode.

A scan signal is transferred to the gate electrode of the thin film transistor via the gate line. An image signal is transferred to the drain electrode via the data electrode. The image signal is applied to the pixel electrode.

The color filter substrate includes a common electrode and color filters. The color filters include a red-color filter, a green color filter and blue-color filter.

The color filter and the common electrode may be formed on the array substrate.

Embodiment 4

Figure 8:
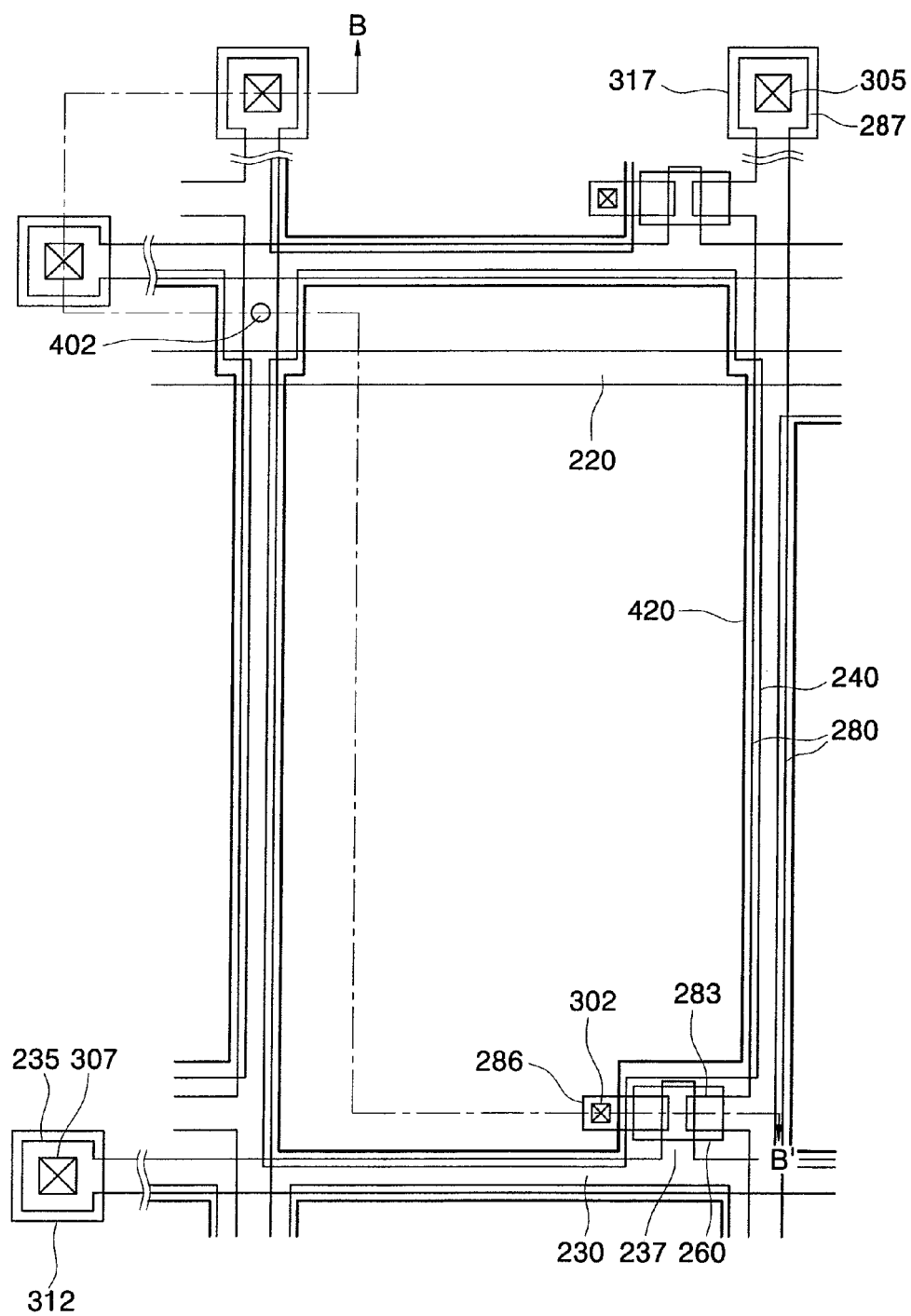
FIG. 8 is a layout showing a portion of a thin film transistor substrate of a liquid crystal display apparatus according to a fourth exemplary embodiment of the present invention.
Figure 9:
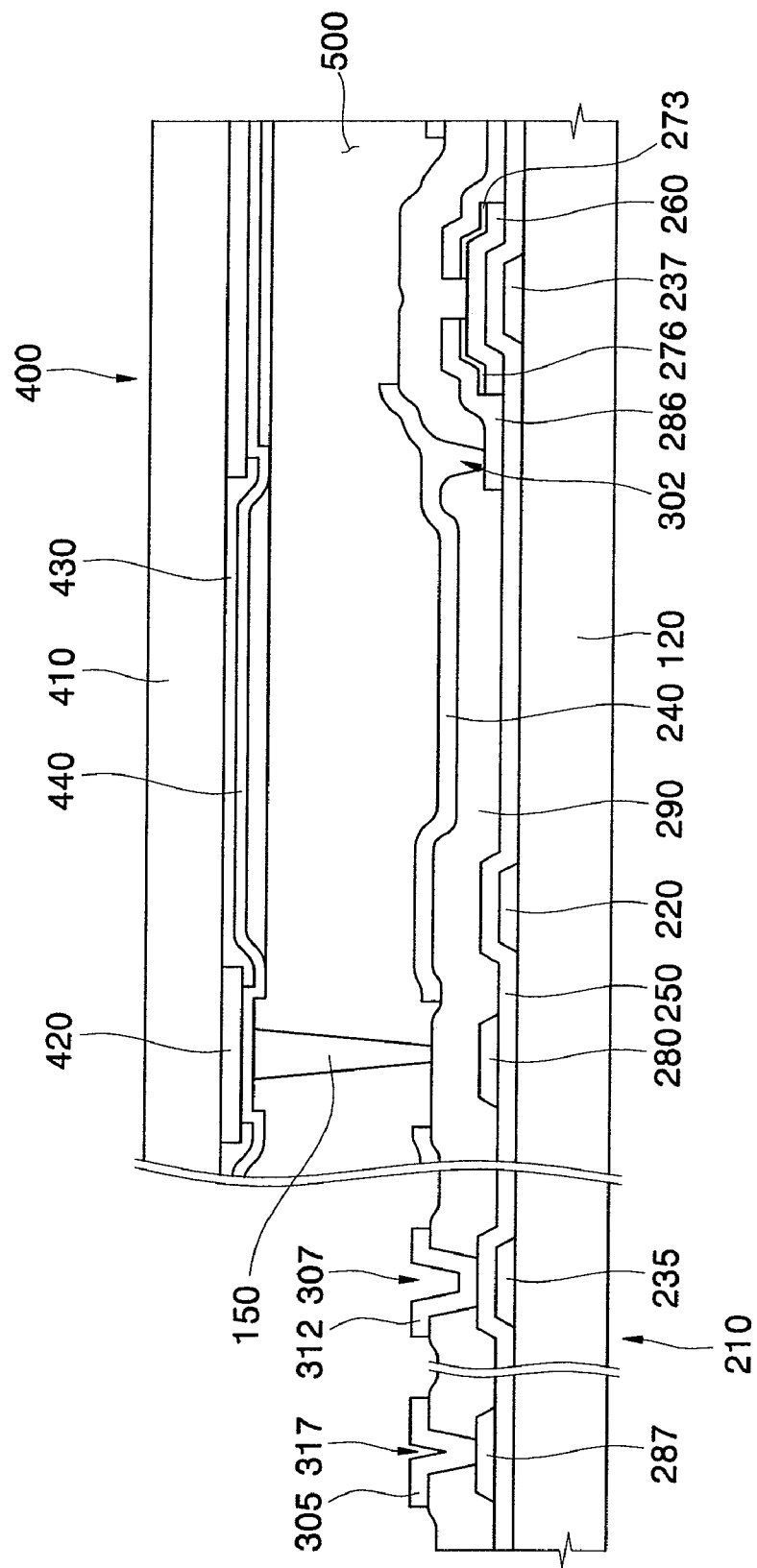
FIG. 9 is a cross-sectional view taken along a line B-B' of FIG. 8.

FIG. 8 is a layout showing a portion of a thin film transistor substrate of a liquid crystal display apparatus according to a fourth exemplary embodiment of the present invention, and FIG. 9 is a cross-sectional view taken along a line B-B' of FIG. 8.

Referring to FIGS. 8 and 9, a gate wiring and a storing line 220 are formed on a first transparent substrate 120. The gate wiring includes a conducting layer that has a high electric conductivity. The gate line 237 and the storing line 220 are tapered.

The gate wiring includes a gate line 230, a gate pad (or end of the gate line) 235 and the gate electrode 237. The gate line 230 is elongated in a first direction. The gate pad 235 is formed at an end portion of the gate line 230. The gate electrode 237 protrudes from the gate line 230.

A protrusion of the gate line 230 that overlaps with a pixel electrode 240 may used as one conductor of an electric condenser so as to store electric charges, so that the storing line 220 may not be formed. In case of a shortage of an electric capacitance, a wiring for storing electric charges may be equipped separately.

A gate insulation layer 250 comprising silicon nitride (SiNx) is formed on the first transparent substrate 120 to cover the storing line 220 and the gate pad 235.

A semiconductor layer 260, such as an amorphous silicon layer is formed on a portion of the gate insulation layer 250, such that the semiconductor layer 260 is disposed over the gate electrode 237.

A contact resistance layers 273 and 276 comprising an amorphous silicon layer having n-type dopants or silicide (n+ a-SiNx:H) are formed on the semiconductor layer 260.

The data wiring comprising high electric conductive material is formed on the contact resistance layer 273 and 276. The data wiring is elongated in a second direction that is substantially perpendicular to the first direction. The data wiring includes a data line 280, a source electrode 283, a data pad 287 and a drain electrode 286. A pixel is defined by one data line 280 and one gate line 230. The data pad 287 is formed at one end of the data wiring. An image signal is applied to the data pad 287 via the data pad 287. The drain electrode 286 is spaced apart from the source electrode 283. The data wiring overlaps with the storing line 220 so as to enhance an electric capacitance. The data wiring may be one conductor of a capacitor for maintaining electric charges. The capacitor is electrically connected with a pixel electrode 240. The data wiring does not cover the semiconductor layer 260.

A protection layer 290 is formed on the data wiring and the semiconductor layer 260. The protection layer 290 may be easily leveled. The protection layer 290 comprises an organic material or a material that has a low dielectric constant, such as a-Si:C:O:H.

The protection layer 290 may further include an insulation layer comprising silicon nitride. Preferably, when the protection layer 290 includes the insulation layer, the protection layer 290 is disposed under the organic material, such that the insulation layer makes contact with the semiconductor layer 260.

A portion of the organic material is not disposed on the gate pad 235 and the data pad 287 so as to be electrically connected to external device for driving the gate driving circuit and the data driving circuit or to a circuit mounted on the first transparent substrate 120.

The protection layer 290 includes contact holes 302 and 305. The contact holes 302 and 305 expose the drain electrode 286 and the data pad 287 respectively. A contact hole 307 exposes the gate insulation layer 250 and the gate pad 235.

The pixel electrode 240 is formed on the protection layer 290. The pixel electrode 240 is disposed in the display region. The pixel electrode 240 is electrically connected with the drain electrode 286 via the contact hole 302. The pixel electrode 240 comprises indium tin oxide (ITO) or indium zinc oxide (IZO). The indium tin oxide and the indium zinc oxide are electrically conductive and transparent.

A sub gate pad 312 and a sub data pad 317 are electrically connected with the gate pad 235 and the data pad 287 via the contact holes 302 and 305, respectively. The sub gate pad 312 and the sub data pad 317 are not essential. The sub gate pad 312 and the sub data pad 317 protect the gate pad 235 and the data pad 287 respectively.

A black matrix 420 is formed on a second transparent substrate 410 of the color filter substrate 400 that faces the array substrate 100. A color filter 430 is formed on the second transparent substrate 410. The color filter 430 faces the pixel electrode 240 of the array substrate 100. The color filter 430 includes a red-color filter, a green-color filter and a blue color filter. A common electrode 440 is formed on the color filter 430 and the black matrix 420 to cover them.

A liquid crystal layer 500 and spacers 150 are interposed between the array substrate 100 and the color filter substrate 400. The spacers 150 maintain a cell gap (or a distance between the array substrate 100 and the color filter substrate 400).

The spacers 150 may be one of the spacer disclosed in the above embodiments and combinations of the embodiments.

Liquid crystal molecules of the liquid crystal layer 500 have positive dielectric constant anisotropy. When the liquid crystal display panel corresponds to twisted nematic mode, the liquid crystal molecules are twisted to form a helical shape. When the liquid crystal display panel corresponds to vertical alignment mode, the liquid crystal molecules are erected with reference to the array substrate 100 and the color filter substrate 400. When the liquid crystal display panel corresponds to optically compensated birefringence mode, the liquid crystal molecules symmetrically arranged with reference to a center of the array substrate 100.

Figure 10:
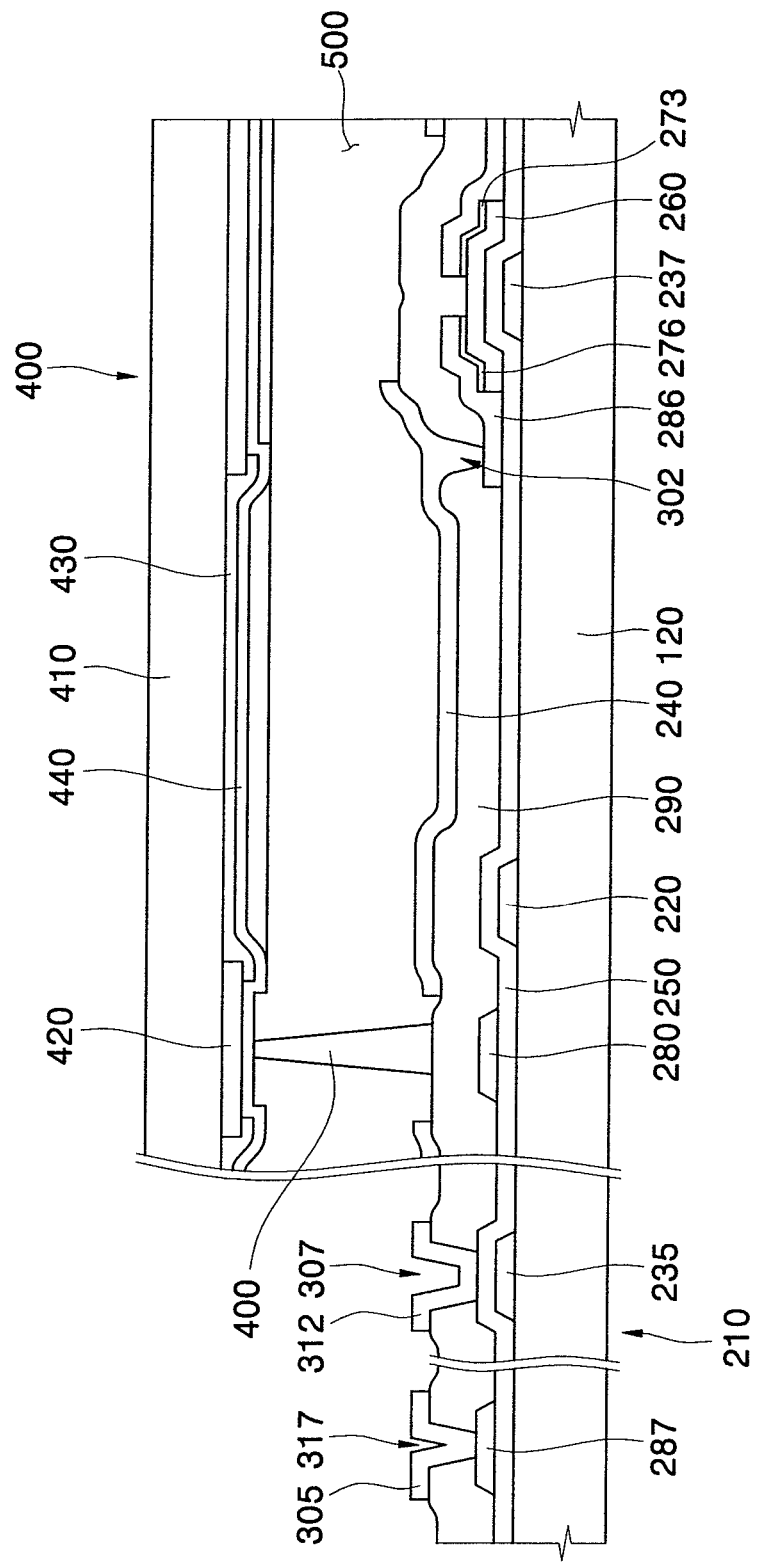
FIG. 10 is a cross-sectional view showing a liquid crystal display apparatus according to a fourth exemplary embodiment of the present invention.

FIG. 10 is a cross-sectional view showing a liquid crystal display apparatus according to a fourth exemplary embodiment of the present invention.

In FIG. 9, the spacers 150 are formed on the array substrate 100. However, the spacers 150 may be formed on the color filter substrate 400 as shown in FIG. 10.

Referring to FIG. 10, the spacers 150 are disposed over the black matrix 420 that faces the gate line 230 or the thin film transistor, so that the black matrix 420 conceals the spacers 150.

Figure 11:
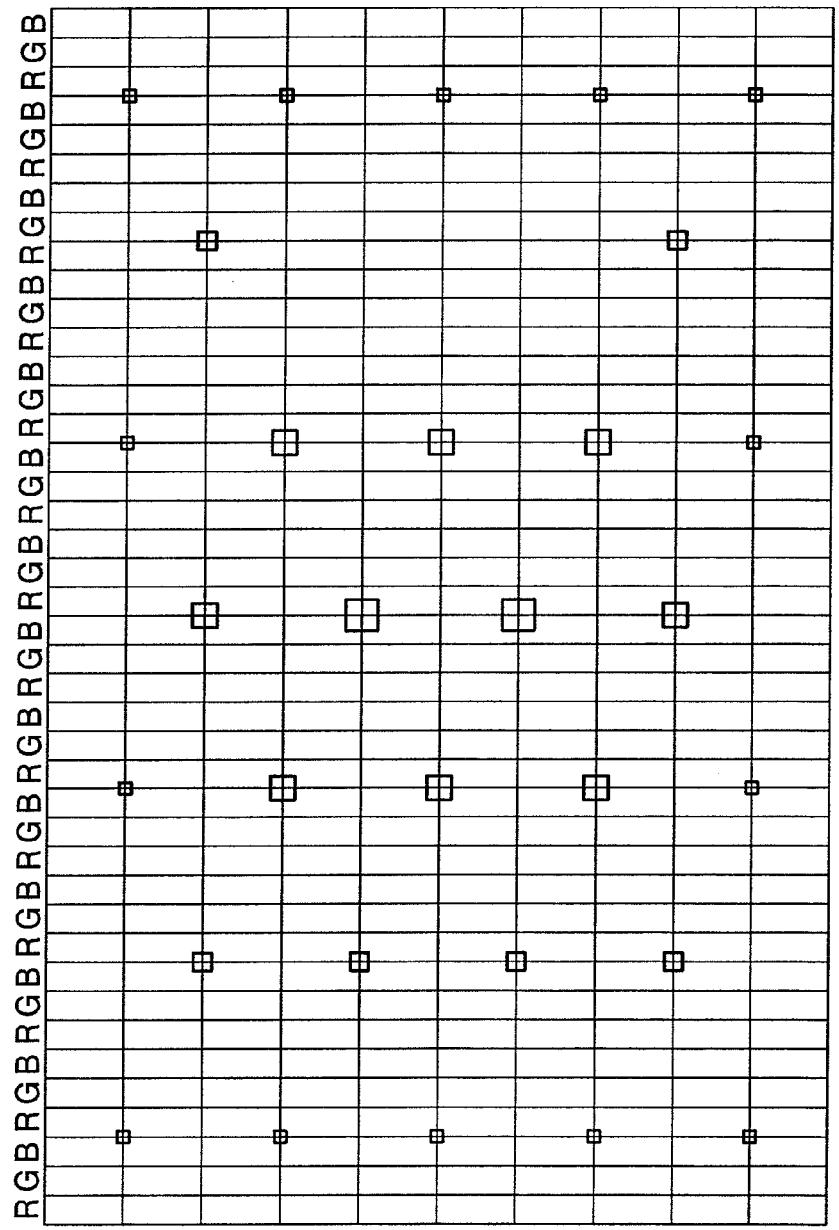
FIG. 11 is a schematic view showing an arrangement of spacers according to a fifth exemplary embodiment of the present invention.

FIG. 11 is a schematic view showing an arrangement of spacers according to a fifth exemplary embodiment of the present invention.

Referring to FIG. 11, the spacers 150 are spaced apart from each other. The spacers 150 are disposed between color filters including a red color filter R, a green color filter G and a blue color filter.

Embodiment 5

Hereinafter, a method of manufacturing a liquid crystal display panel according to a fifth embodiment of the present invention is explained.

Referring to FIGS. 1 through 11, the gate wiring, the data wiring, the thin film transistor and the pixel electrode are formed on the array substrate 100 of the liquid crystal display panel 110. An organic material is coated and patterned to form the spacers 150. The spacers 150 may have different tapered angle, different contact area, or different polymer linking density.

The red, green and blue color filters 430 and the common electrode 440 are formed on the second transparent substrate 410. The color filters 430 and the common electrode 440 may be formed on a same substrate with the thin film transistor.

The array substrate 100 that includes spacers 150 formed thereon is larger than the color filter substrate 400 by about 10%-30%.

The spacers 150 may be formed on the color filter substrate 400.

When the spacers 150 are formed via a photolithography process, the spacers may be arranged in a specific position, and the distance between the spacers 150 is uniform.

Further, the spacers 150 may be formed to have short height, so that the cell gap may be small. Further, the spacers 150 are not formed on the pixel electrode to enhance the display quality.

A fence 160 is formed on the array substrate 100 or the color filter substrate 200 having the spacers 150 formed thereon. The fence 160 is a closed curve that has no opening for liquid crystal material injection. The fence 160 may be hardened, when ultraviolet rays are irradiated or heated. The fence 160 may include a spacer that maintains the cell gap.

The fence 160 does not include the opening for liquid crystal material injection, so that adjusting an amount of the liquid crystal material is important. The fence 160 may include a buffer region for overflowing liquid crystal material. The fence 160 may include a protection film that prevents a reaction between the fence 160 and the liquid crystal material. The protection film is formed on a portion of the fence 160, where the liquid crystal material makes contact with the fence 160.

The liquid crystal material is dropped on the array substrate 100 or on the color filter substrate 200 including the fence 160 formed thereon. The liquid crystal material may be injected by a syringe or sprayed by a sprayer.

Then, the array substrate 100 and the color filter substrate 400 are transferred to a vacuum chamber of an assembler. The array substrate 100 and the color filter substrate 400 are compressed. Then, ultraviolet rays are irradiated on the fence 160 to harden the fence 160. Thus, the liquid crystal display panel 110 is completed. While irradiating the ultraviolet rays, an alignment of the array substrate 100 and the color filter substrate 400 is adjusted minutely. The fence 160 has a little flexibility. Although the fence 160 and a spacer 150 mixed with the fence 160 support an edge portion of the array substrate 100 and the color filter substrate 400, the spacers 150 support the center portion of the array substrate 100 and the color filter substrate 400. The spacers 150 are more flexible than the fence 160.

The spacers 150 may be tapered, such that a tapered angle of the spacers 150 becomes larger in a direction from a center of the liquid crystal display panel 101 to an edge of the liquid crystal display panel 101. However, a difference of the tapered angle between the spacer 150 of the edge and the spacer 150 of the center is less than about 40°.

A diameter of the spacers 150 may become smaller in a direction from the center to the edge.

A polymer linking density of the spacers 150 may become higher in a direction from the center to the edge. Preferably, Young's modulus between the spacer of the center and the spacer of the edge does not exceed about 100 N/mm$^2$.

Thus, a uniform cell gap may be maintained between the center portion of the liquid crystal display panel 101 and the edge portion of the liquid crystal display panel 101.

Then, each of the liquid crystal display panels 101, 102, 103 and 104 is separated from the mother substrate 110.

Embodiment 6

Figure 12:
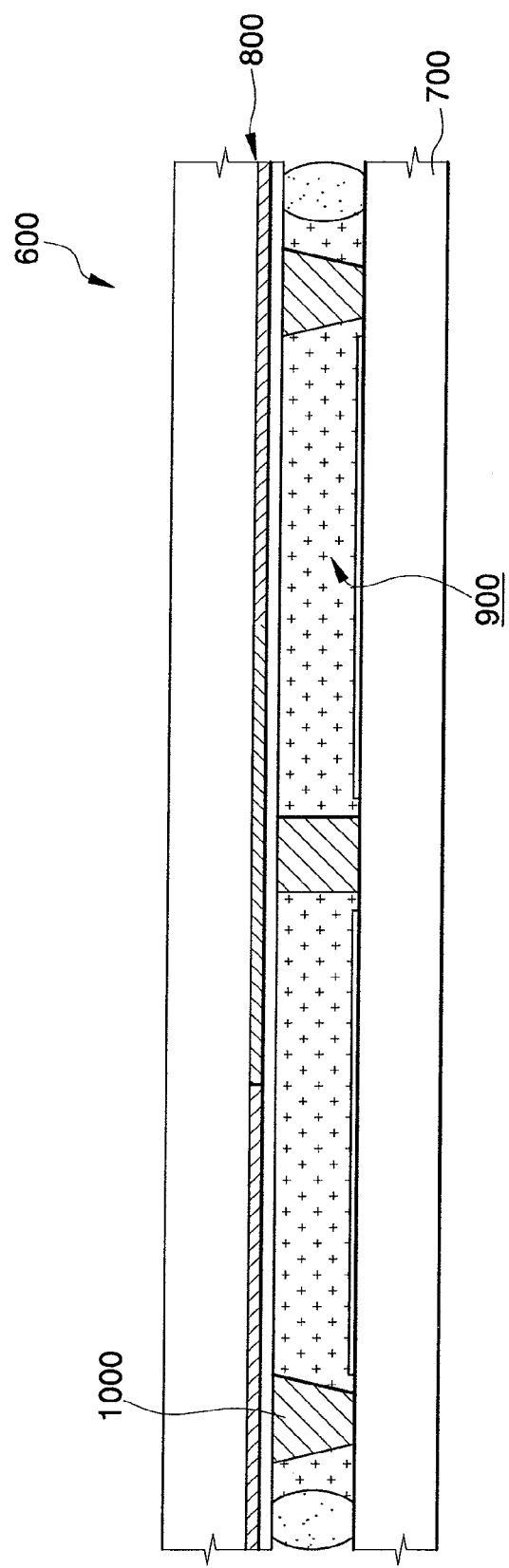
FIG. 12 is a cross-sectional view showing a liquid crystal display apparatus according to a sixth exemplary embodiment of the present invention.

FIG. 12 is a cross-sectional view showing a liquid crystal display apparatus according to a sixth exemplary embodiment of the present invention.

Referring to FIG. 12, a liquid crystal display apparatus 600 includes a first substrate 700, a second substrate 800, a liquid crystal 900 and spacers 1000.

Figure 13:
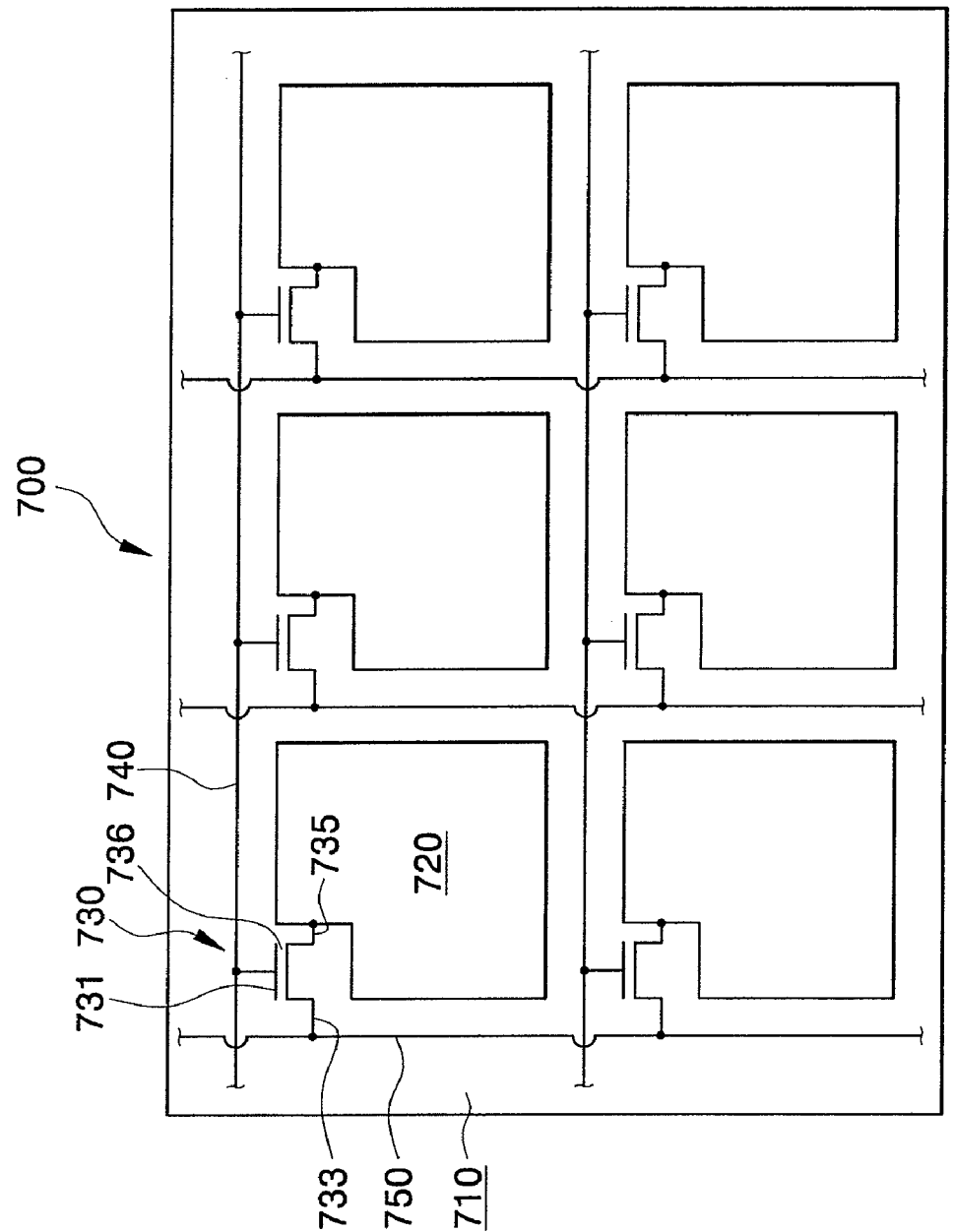
FIG. 13 is a schematic view showing a thin film transistor substrate of FIG. 12.

FIG. 13 is a schematic view showing a thin film transistor substrate of FIG. 12.

Referring to FIG. 13, the first substrate 700 includes a first transparent substrate 710, pixel electrodes 720, a thin film transistor 730, a gate line 740 and a data line 750.

A glass substrate that has high transmissivity may be used as the first transparent substrate 710.

The pixel electrodes 720 are formed on the first transparent substrate 710, such that the pixel electrodes 720 are arranged in a matrix shape. For example, an area of each of the pixel electrodes 720 of 17 inch liquid crystal display panel is about 88 μm×264 μm.

When a gate signal is applied to the thin film transistor 730 via the gate line 740, the thin film transistor is turned on. Then, a pixel voltage corresponding to an image is applied to each of the pixel electrodes 720.

The thin film transistor 730 includes a gate electrode 731, a source electrode 733, a drain electrode and a channel layer 736.

The gate electrode 731 is formed on the first transparent substrate 710. The gate electrode 731 is electrically insulated from the channel layer 736.

The drain electrode 736 and the source electrode 733 are spaced apart, so that the drain electrode 736 and the source electrode 733 are electrically insulated from each other. The drain electrode 736 and the source electrode 733 are formed on the channel layer 736.

The gate line 740 is electrically connected with the gate electrode 731 to form a channel in the channel layer 736 of the thin film transistor 730.

A threshold voltage Vth for forming the channel is applied to the gate line 740.

The data line 750 is electrically connected with source electrode 733 of the thin film transistor 730. The drain electrode 735 is electrically connected with the pixel electrode 720. Thus, when the thin film transistor 730 is turned on, the data line 750 is electrically connected with the pixel electrode 720.

Figure 14:
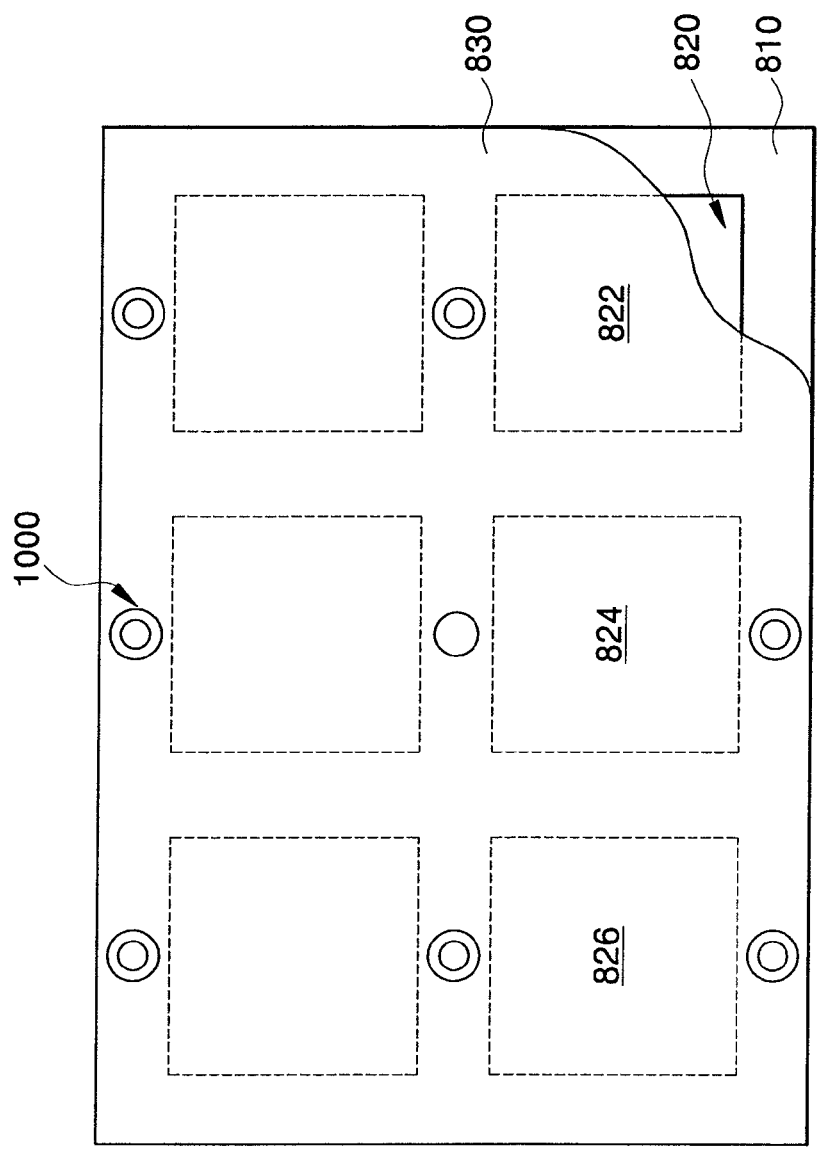
FIG. 14 is a schematic view showing a color filter substrate of FIG. 12.

FIG. 14 is a schematic view showing a color filter substrate of FIG. 12.

Referring to FIG. 14, the second substrate 800 includes a second transparent substrate 810, a color filter 820 and a common electrode 830. The second substrate 800 faces the first substrate 700 of FIG. 13.

A glass substrate that has high transmissivity may be used as the second transparent substrate 810. The color filter 820 may be formed on the second transparent substrate 810.

The color filter 820 includes a red-color filter 822, a green-color filter 824 and a blue color filter 826. A light having a wavelength that corresponds to red-color passes through the red-color filter 822. A light having a wavelength that corresponds to green-color passes through the green-color filter 824. A light having a wavelength that corresponds to blue-color passes through the blue-color filter 826.

The common electrode 830 is coated on the second transparent substrate 810 to cover the color filter 820. The common electrode 830 faces the pixel electrode 720 of the first substrate 700.

The first and second substrates 700 and 800 are assembled with each other, when the liquid crystal 900 is injected.

When the cell gap is uniform, the liquid crystal display apparatus 600 displays a high quality image.

The spacers 1000 are interposed between the first and second substrates 700 and 800, so that the spacers 1000 maintain the cell gap.

The spacers 1000 correspond to a rigid spacer. A photoresist are coated and patterned, so that the rigid spacer is formed.

Figure 15:
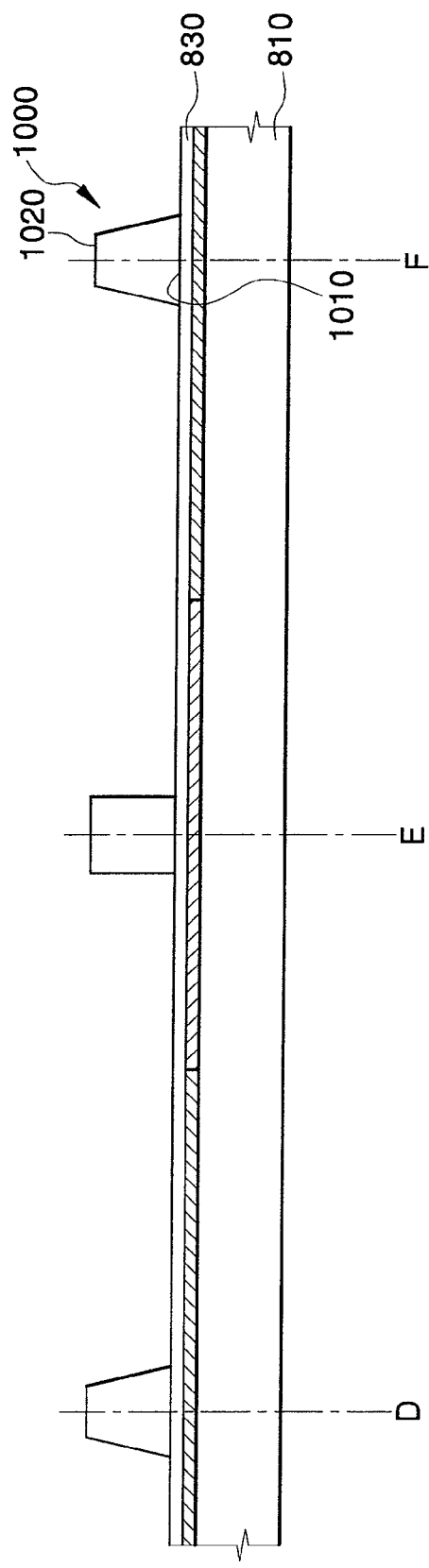
FIG. 15 is a cross-sectional view showing spacers formed on a color filter substrate of FIG. 12.

FIG. 15 is a cross-sectional view showing spacers formed on a color filter substrate of FIG. 12.

Referring to FIGS. 12 and 15, spacers 1000 are formed over the second substrate 800. In FIG. 15, only three spacers 1000 are illustrated for example, about 1000,000 numbers of spacers are formed over the second substrate 800 for 17 inch liquid crystal display apparatus 600. The spacers 1000 are arranged in a matrix shape.

The spacers 1000 are formed over the second substrate 800, such that the spacers 1000 are disposed between the pixel electrodes 720, when the first and second substrates 700 and 800 are assembled with each other. Thus, the spacers 1000 do not deteriorate the display quality.

The spacer 1000 has a column shape having a first contact face 1020 and a second contact face 1010. The first contact face 1020 makes contact with the first substrate 700. The second contact face 1010 makes contact with the second substrate 800.

The spaces 1000 are compressed, when an external compressive stress is applied to the spacers 1000. Thus, the cell gap is reduced when the external compressive stress is applied to the liquid crystal display apparatus 600.

The external compressive stress corresponds to an atmospheric pressure and a pressure caused by self-weight.

Figure 16:
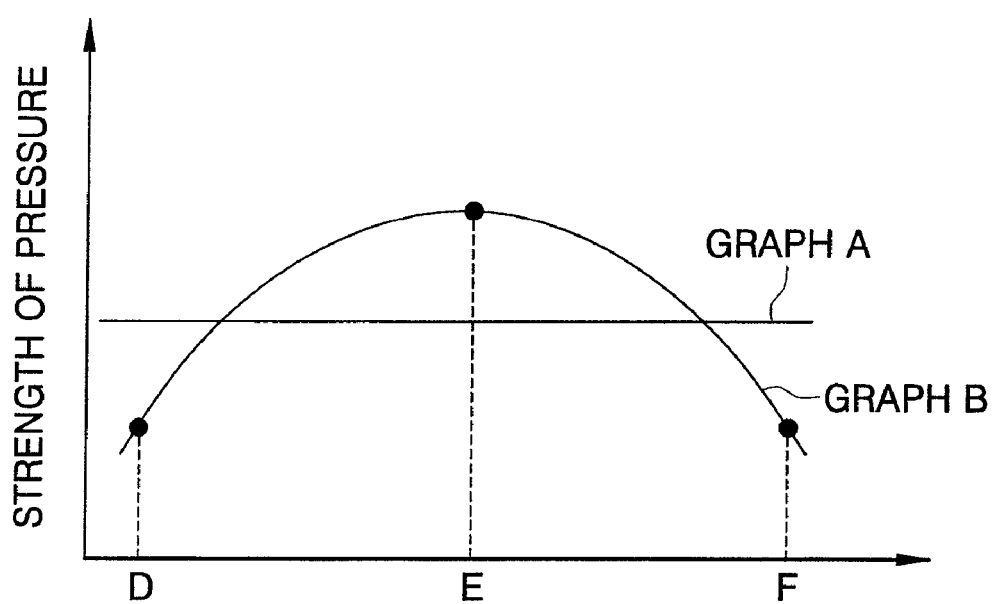
FIG. 16 is a graph showing a relation between amount of compression and a position.

FIG. 16 is a graph showing a relation between amount of compression and a position.

Generally, when the second substrate 800 is disposed over the first substrate 700, the compressive stress caused by the atmospheric pressure is equally applied to overall area of the second substrate 800, as shown in graph 'B'.

The compressive stress caused by the self-weight is maximal at the center 'E' of the second substrate 800. The compressive stress caused by the self-weight is minimal at the edges 'D' and 'F' of the second substrate 800.

The compressive stress becomes smaller in a direction from the center 'E' to the edges 'D' and 'F', as shown in graph 'A'.

Thus, a total compressive stress becomes smaller in the direction from the center 'E' to the edges 'D' and 'F'.

When same spacers are formed at the center portion and the edge portion, the center portion of the second substrate 800 sags to form a U-shape. Thus, the cell gap of the center is smaller than that of the edge. That induces a deterioration of the display quality.

The spacers may be formed, such that the spacer disposed at the center portion has a larger diameter than the spacer disposed at the edge portion.

In case a distance between the pixel electrodes is too small, adjusting the diameter of the spacer meets a limitation.

Thus, a shape of the spacers may be adjusted so as to maintain the uniform cell gap, while not changing the diameter of the spacer.

Referring again to FIG. 15, the spacer 1000 disposed at the center portion 'E' has different shape from the spacer 1000 disposed at the edge portions 'D' and 'F'.

For example, the first contact face 1020 of the spacers 1000 disposed at the edge portions 'D' and 'F' is smaller than the first contact face 1020 of the spacers 1000 disposed at the center portion 'E'. However, the second contact face 1010 of the spacers 1000 disposed at the edge portions 'D' and 'F' is substantially equal to the first contact face 1020 of the spacers 1000 disposed at the center portion 'E'.

An area of the first contact face 1020 may be easily calculated from an external compressive stress, Young's modulus and the height of the spacers 1000.

The area of the first contact face 1020 of the spacers gradually decreases in the direction from the center portion 'E' of the second substrate 800 to the edge portion 'D' and 'F' of the second substrate 800. Thus, even though the compressive stress becomes weaker in the direction from the center portion 'E' to the edge portion 'D', the cell gap is maintained uniformly.

Figure 17A:
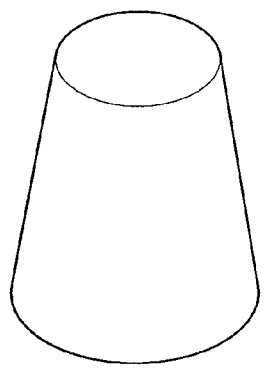
FIGS. 17A to 17C are perspective views showing spacers formed in an edge portion of a color filter substrate.
Figure 17B:
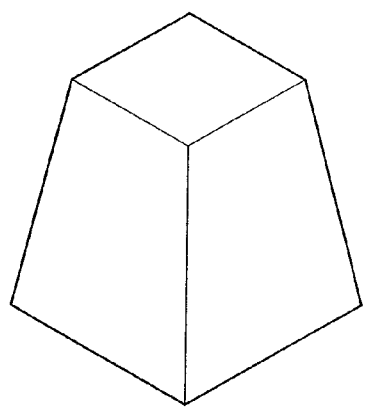
Figure 17C:
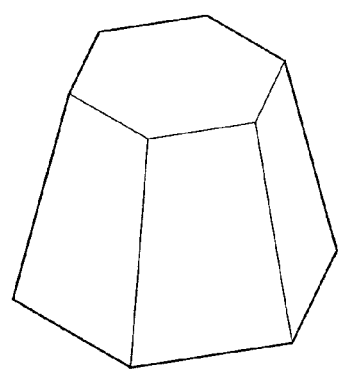

FIGS. 17A to 17C are perspective views showing spacers formed in an edge portion of a color filter substrate.

Referring to FIGS. 17A-17C, spacers formed in an edge portion may have a truncated cone shape, a frustum of rectangular pyramid shape, a frustum of hexagonal pyramid shape etc., so that the first contact face 1020 is smaller than the second contact face 1010.

Figure 18A:
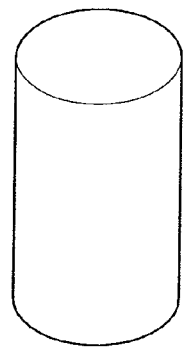
FIGS. 18A to 18C are perspective views showing spacers formed in a center portion of a color filter substrate.
Figure 18B:
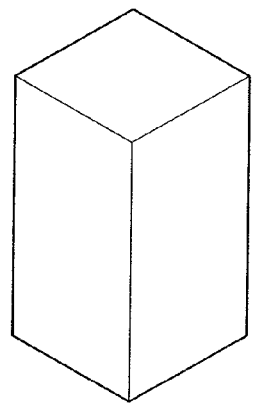
Figure 18C:
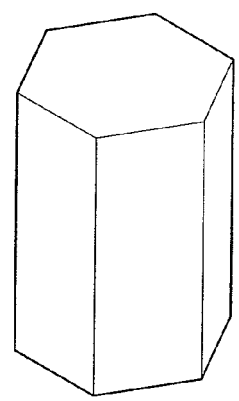

FIGS. 18A to 18C are perspective views showing spacers formed in a center portion of a color filter substrate.

Referring to FIGS. 15 and 18A to 18C, the spacers formed in a center portion of the second substrate 800 may have a cylindrical shape, a rectangular prism shape, a hexagonal prism shape. etc. Thus, the area of the first contact face 1020 is maximum at the center of the second substrate 800. The area of the first contact face 1020 is substantially equal to the area of the second contact face 1010.

A ratio of the first contact face 1020 to the second contact face 1010 (the first contact face 1020/the second contact face 1010) of the spacers formed at the second substrate 800 may gradually decrease according to the compressive stress applied to the second substrate 800 due to the self-weight.

Thus, the cell gap of the first and second substrate 700 and 800 is maintained uniformly.

Figure 19:
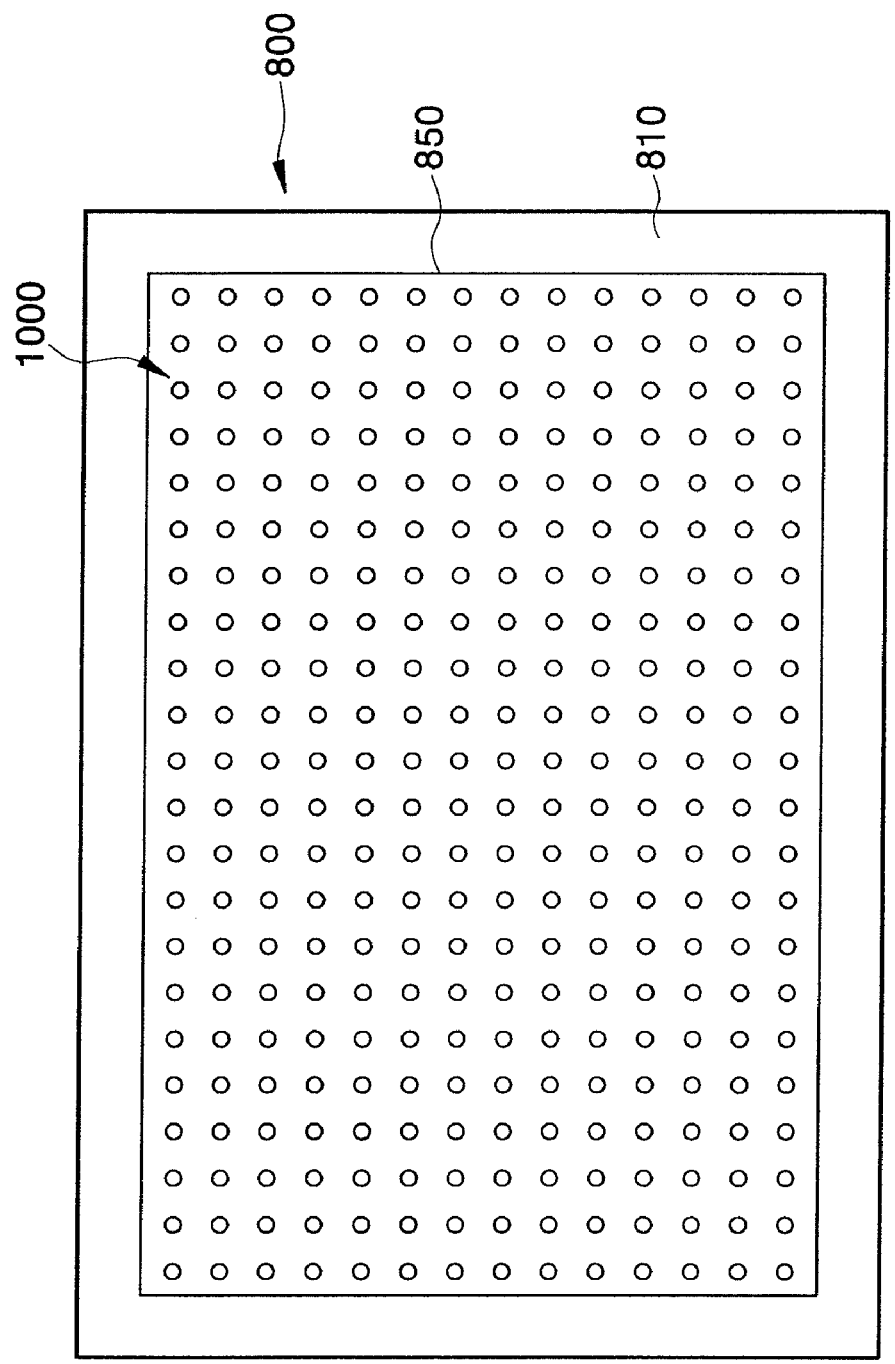
FIG. 19 is a schematic plan view showing spacers and fence formed on a color filter substrate.

FIG. 19 is a schematic plan view showing spacers and fence formed on a color filter substrate.

Referring to FIG. 19, a fence 850 is formed on an edge portion of the second substrate 800, after the spacers 1000 are formed on the second substrate 800.

The fence 850 comprises a mater that is hardened, when ultraviolet rays are irradiated onto the mater. Thus, the fence 850 is hardened, when the ultraviolet rays are irradiated onto the fence 850. The fence 850 has a closed curve shape, so that the fence 850 and the second substrate 800 form a space for receiving the liquid crystal 900.

Referring again to FIG. 12, the liquid crystal 900 is dropped in the space.

When the liquid crystal 900 is filled, the second substrate 800 is assembled with the first substrate 700. Then, the ultraviolet rays are irradiated onto the fence 850 to harden the fence 850, so that the first and second substrates 700 and 800 are assembled tightly with each other.

Hereinafter, a method of manufacturing the first substrate 700 of the liquid crystal display apparatus is explained.

Figure 20:
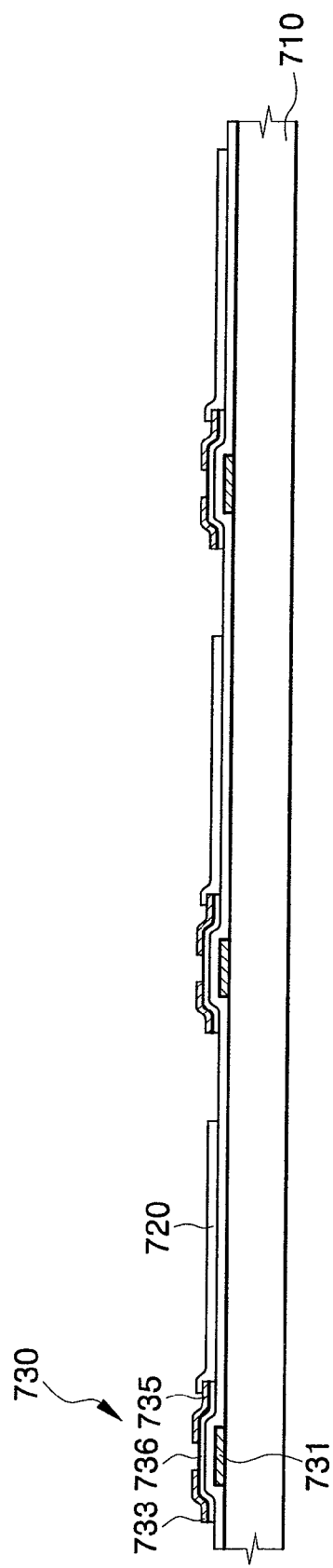
FIG. 20 is a cross-sectional view showing a process of manufacturing a thin film transistor substrate of a liquid crystal display apparatus according to a sixth exemplary embodiment of the present invention.

FIG. 20 is a cross-sectional view showing a process of manufacturing a thin film transistor substrate of a liquid crystal display apparatus according to a sixth exemplary embodiment of the present invention.

Referring to FIG. 20, thin film transistors 730 are formed on the first transparent substrate 710. Each of the thin film transistors 730 includes a gate electrode 731, a source electrode 733, a drain electrode 735 and a channel layer 736.

The thin film transistors 730 are arranged in a matrix shape on the first transparent substrate 710.

A pixel electrode 720 is electrically connected to the drain electrode 735. The pixel electrode 720 comprises an indium tin oxide (ITO) or indium zinc oxide (IZO). The indium tin oxide (ITO) or indium zinc oxide (IZO) is transparent and electrically conductive.

Figure 21:
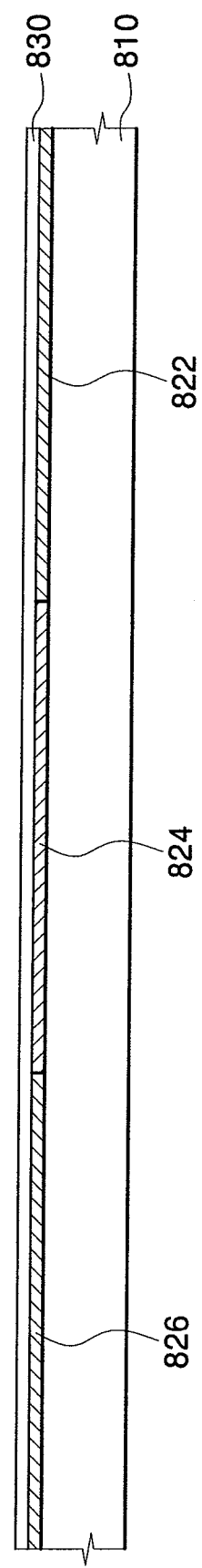
FIG. 21 is a cross-sectional view showing a process of manufacturing a color filter substrate of a liquid crystal display apparatus according to a sixth exemplary embodiment of the present invention.

FIG. 21 is a cross-sectional view showing a process of manufacturing a color filter substrate of a liquid crystal display apparatus according to a sixth exemplary embodiment of the present invention.

Referring to FIG. 21, a red color filter 822, a green color filter 824 and a blue color filter 826 is arranged alternatively. The color filters are arranged in a matrix shape.

A common electrode 830 is formed on the color filters. The common electrode 830 comprises the indium tin oxide (ITO) or indium zinc oxide (IZO).

Figure 22:
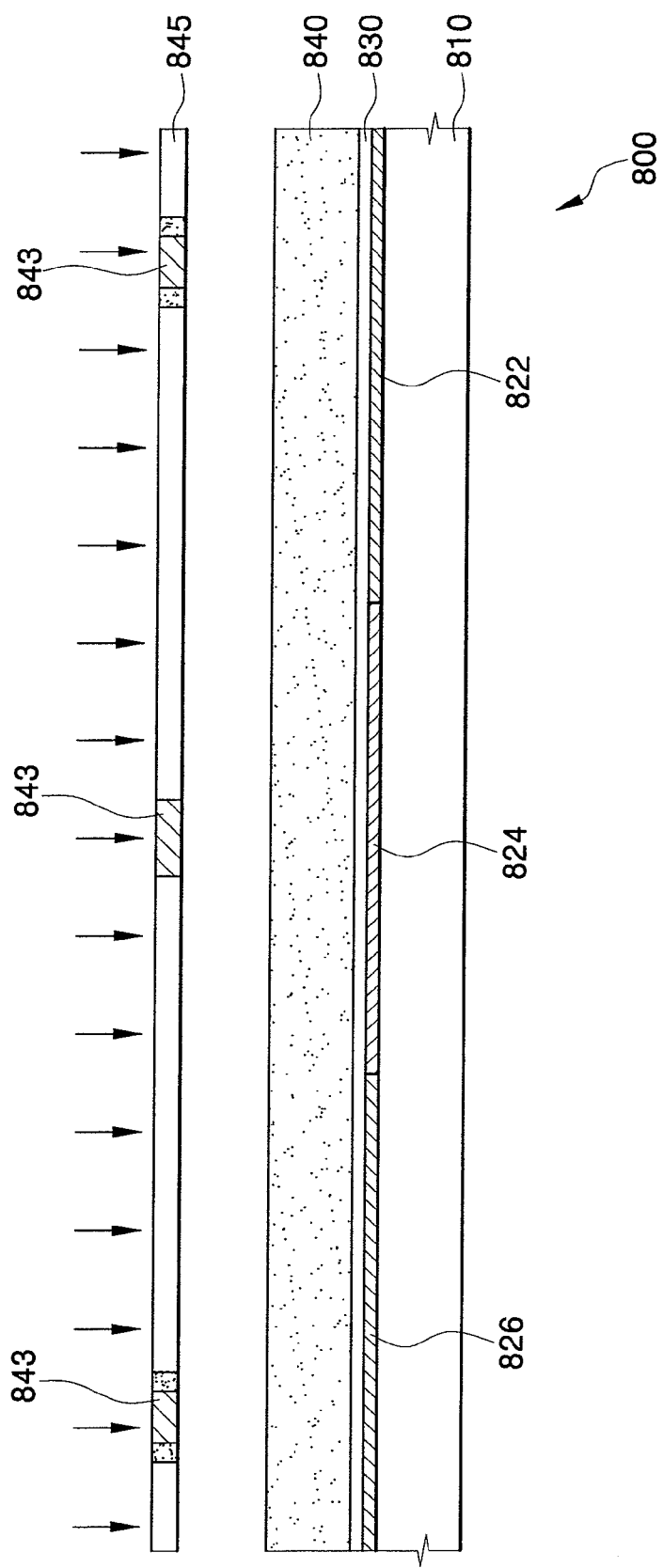
FIG. 22 is a cross-sectional view showing a process of manufacturing spacers according to a sixth exemplary embodiment of the present invention.

FIG. 22 is a cross-sectional view showing a process of manufacturing spacers according to a sixth exemplary embodiment of the present invention.

Referring to FIG. 22, a photoresist material is coated on the common electrode 830 to form a photoresist thin film 840. A spin coating method may be used, when coating the photoresist thin film on the common electrode 830.

The photoresist thin film 840 is firstly cured via soft baking.

Then, a pattern mask is aligned over the photoresist thin film 840. The pattern mask includes a pattern that corresponds to a spacer. The photoresist thin film 840 is exposed and developed, so that the spacer is formed.

Figure 23:
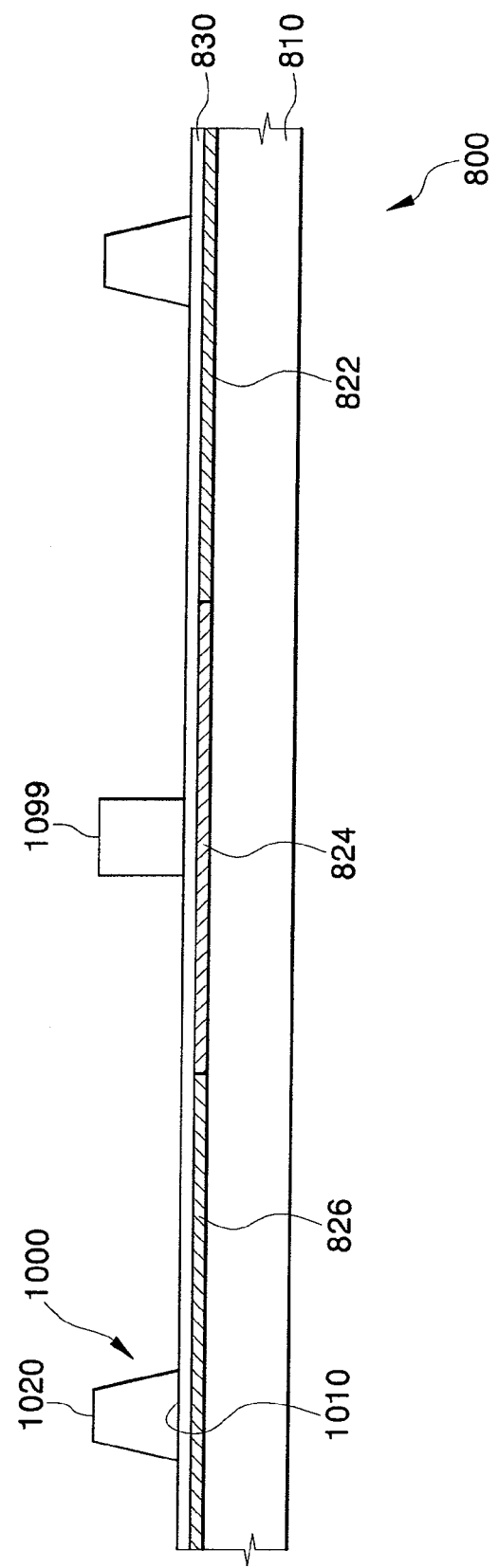
FIG. 23 is a cross-sectional view showing a spacers formed on a color filter substrate according to a sixth exemplary embodiment of the present invention.

FIG. 23 is a cross-sectional view showing spacers formed on a color filter substrate according to a sixth exemplary embodiment of the present invention.

Spacers 1000 are spaced apart from each other. The spacers 1000 are disposed, such that the spacers 1000 are disposed between pixel electrodes 720, when first and second substrates are assembled together.

The pattern of the pattern mask of FIG. 22 is different from each other, so that shapes of the spacers 1000 are different from each other. The pattern mask is adjusted to form the spaces as shown in FIG. 23.

Each of the spacers 1000 has first and second contact faces 1020 and 1010. The shapes of the spacers 1000 are modulated in a direction from a center of the second transparent substrate 810 to an edge of the second transparent substrate 810.

In detail, an area of the first face 1020 of the spacers gradually decreases in a direction from the center of the second transparent substrate 810 to the edge of the second transparent substrate 810, while an area of the second face 1010 is maintained.

The spacers 1000 disposed on the edge portion of the second transparent substrate 810 may have a circular truncated cone shape, a frustum of rectangular pyramid shape, a frustum of hexagonal pyramid shape, etc., as shown in FIGS. 17A to 17C.

An area of the first and second contact faces 1020 and 1020 of a spacer 1099 disposed at the center of the second transparent substrate 810 is the same.

The spacer 1099 disposed at the center of the second transparent substrate 810 may have a cylindrical shape, a rectangular prism shape, a hexagonal prism shape, etc., as shown in FIGS. 18A to 18C.

Figure 24:
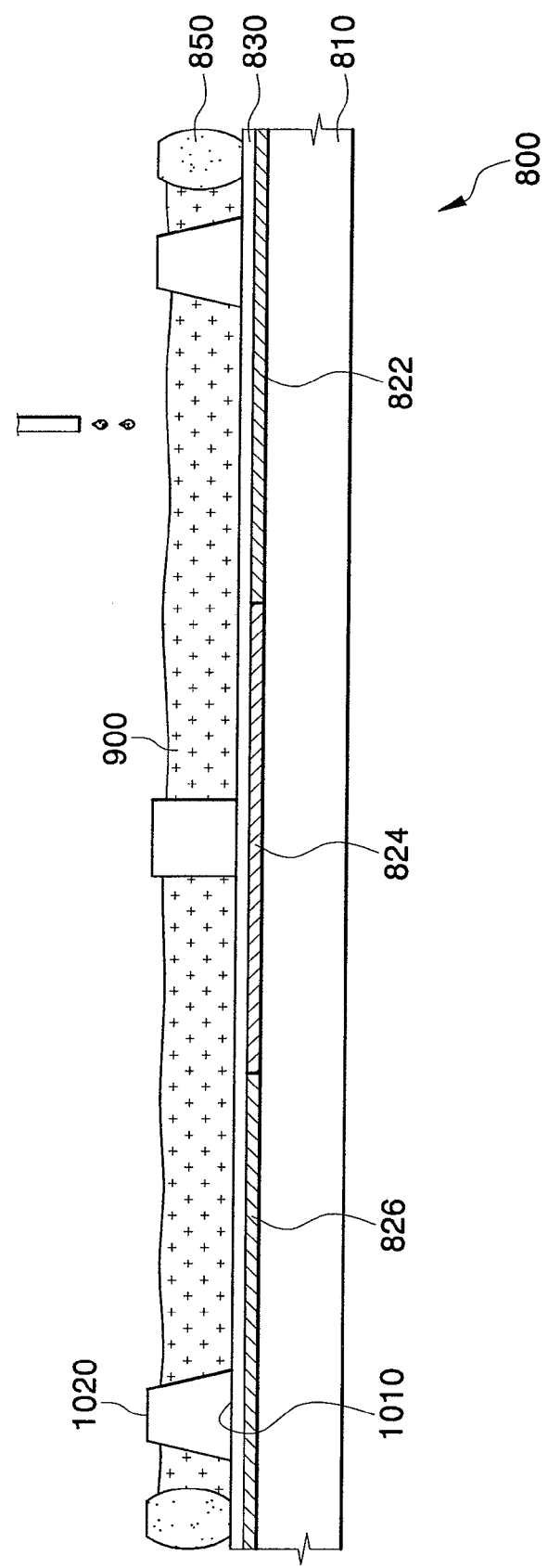
FIG. 24 is a cross-sectional view showing a liquid crystal filled in a space formed by a fence and a color filter substrate cross-sectional view showing a process of manufacturing spacers according to a sixth exemplary embodiment of the present invention.

FIG. 24 is a cross-sectional view showing a liquid crystal filled in a space formed by a fence and a color filter substrate cross-sectional view showing a process of manufacturing spacers according to a sixth exemplary embodiment of the present invention.

Referring to FIG. 24, when spacers 1000 are formed on the second substrate 800, a fence 850 may be formed on a first substrate 700 or the second substrate 800.

Then, liquid crystal 900 is dropped and filled in a space defined by the fence 850.

For example, the fence 850 is formed on the second substrate 800.

Referring again to FIG. 12, when the liquid crystal 900 is filled in the space defined by the fence 850, the first substrate 700 is assembled with the second substrate 800 to form the liquid crystal display apparatus. The cell gap or the distance between the first substrate 700 and the second substrate 800 is less than about 0.15 μm.

Embodiment 7

Figure 25:
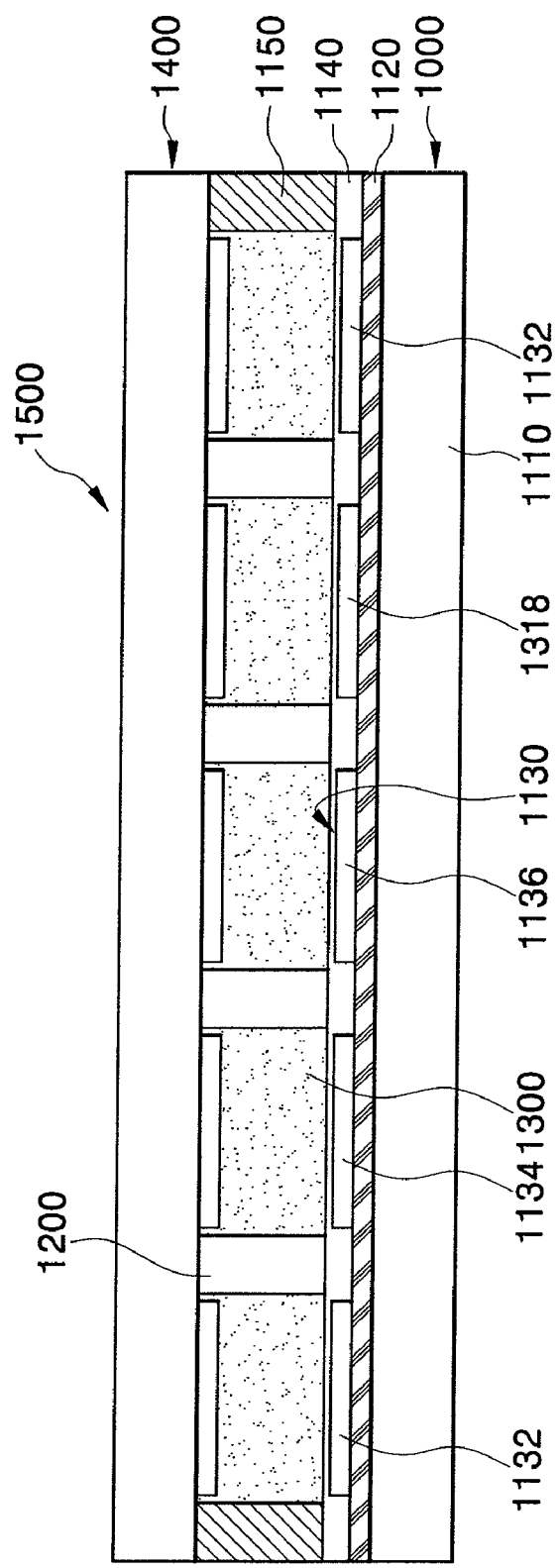
FIG. 25 is a cross-sectional view showing a liquid crystal display apparatus according to a seventh embodiment of the present invention.

FIG. 25 is a cross-sectional view showing a liquid crystal display apparatus according to a seventh embodiment of the present invention.

Referring to FIG. 25, a liquid crystal display apparatus 1500 includes a first substrate 1000, a second substrate 1400, spacers 1200 and a liquid crystal layer 1300.

The spacers 1200 and the liquid crystal layer 1300 are disposed between the first substrate 1000 and the second substrate 1400. The spacers 1200 maintain the cell gap (or the distance between the first substrate 1000 and the second substrate 1400).

Figure 26:
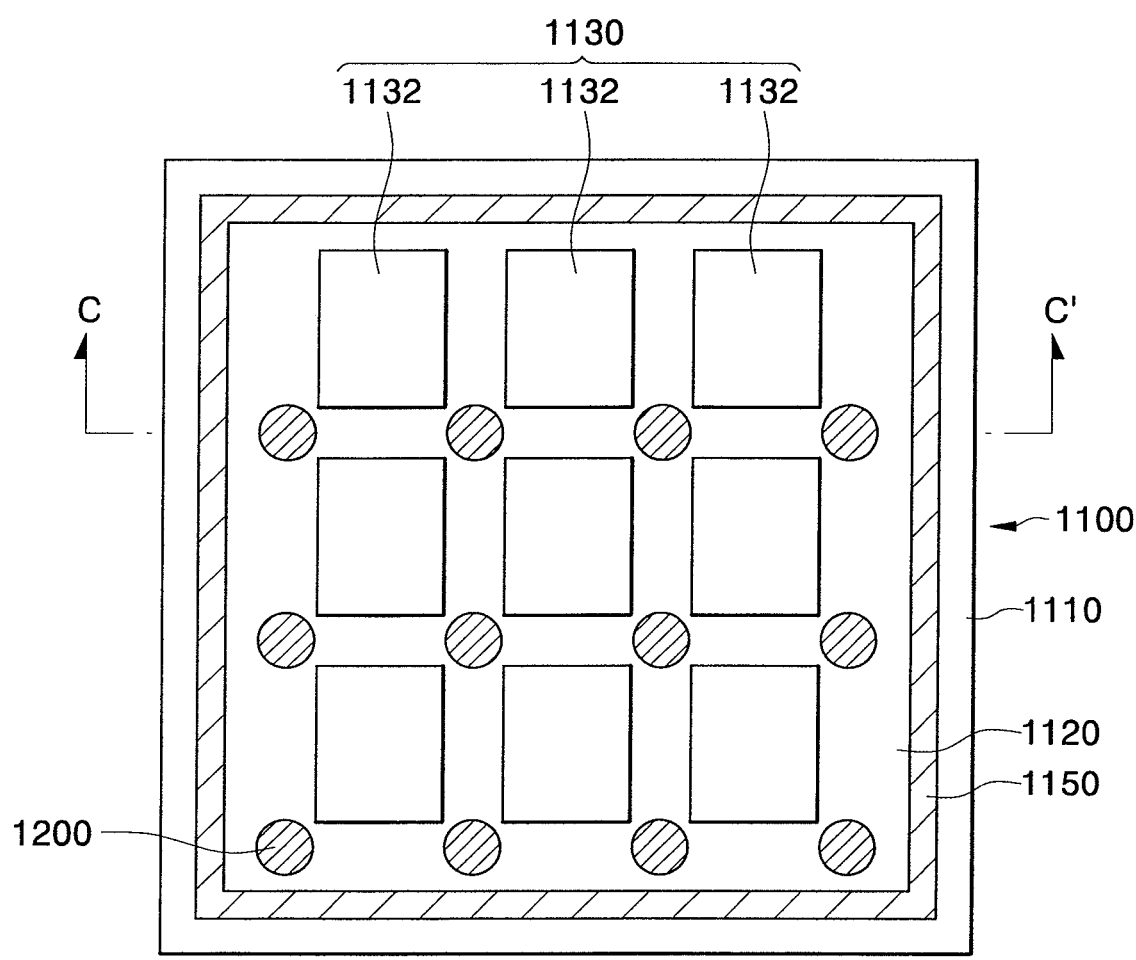
FIG. 26 is a schematic plan view showing a color filter substrate of a liquid crystal display apparatus of FIG. 25.

FIG. 26 is a schematic plan view showing a color filter substrate of a liquid crystal display apparatus of FIG. 25.

Referring to FIGS. 25 and 26, the first substrate 1000 includes a transparent substrate 1110, a black matrix 1120, a color filter 1130, a first electrode (or a common electrode) and a sealing wall (or fence) 1150.

The transparent substrate 1110 supports the black matrix 1120, a color filter 1130 and a first electrode 1140.

The black matrix 1120 comprises Chromium (Cr) or Chromium oxide ($CrO_2$).

Chromium (Cr) or Chromium oxide ($CrO_2$) are coated on the transparent substrate 1110 and patterned to form the black matrix 1120. The black matrix 1120 has a lattice-shape.

The black matrix 1120 prevents a light from leaking via a portion disposed between color filters 1130.

The color filters 1130 are enwrapped with the black matrix 1120. The color filters 1130 includes a red color filter 1132, a green color filter 1134 and a blue color filter 1136. The red color filter 1132 filters a white light, so that only a light that has a wavelength corresponding to the red color may pass through the red color filter 1132.

The green color filter 1134 filters a white light, so that only a light that has a wavelength corresponding to the green color may pass through the green color filter 1134.

The blue color filter 1136 filters a white light, so that only a light that has a wavelength corresponding to the blue color may pass through the blue color filter 1136.

An edge of the color filters 1130 overlaps with the black matrix 1120, such that the edge of the color filters 1130 is disposed on the black matrix 1120.

The first electrode 1140 is formed on the color filters 1130, such that the first electrode 1140 covers the whole region of the transparent substrate 1110.

A reference voltage is applied to the first electrode 1140.

Figure 27:
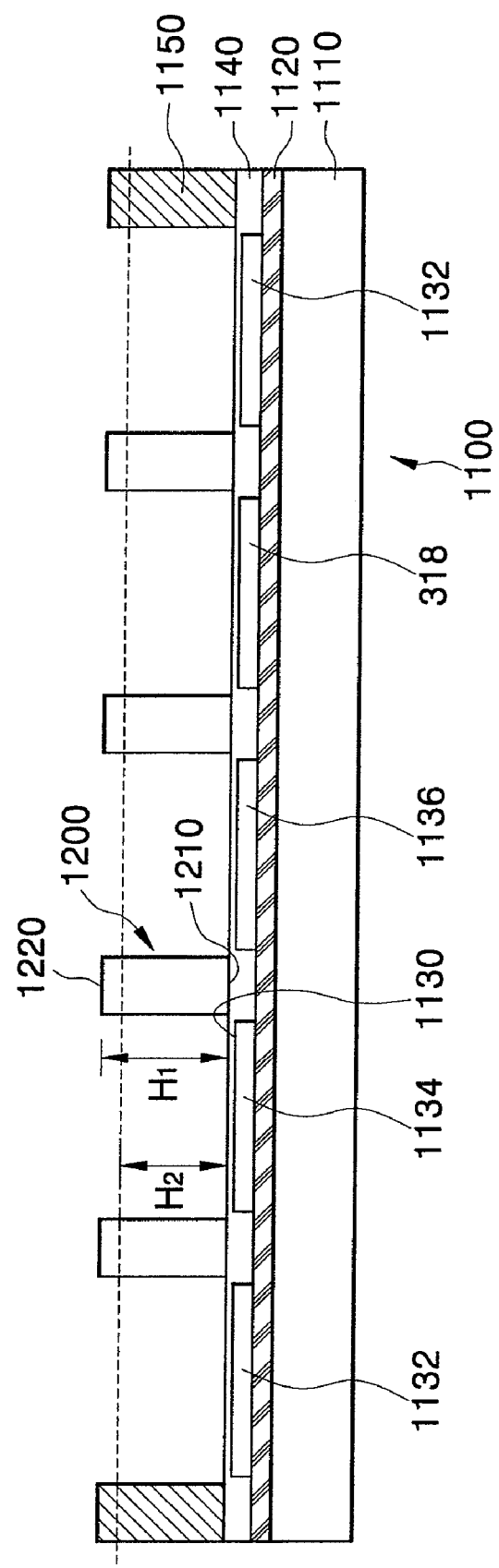
FIG. 27 is a cross-sectional view taken along a line C-C' of FIG. 26.

FIG. 27 is a cross-sectional view taken along a line C-C' of FIG. 26.

Referring to FIGS. 26 and 27, spacers 1200 are formed to have a first height H1. The spacers 1200 are disposed over the black matrix 1120.

The spacers 1200 may have a cylindrical shape, so that the spacers 1200 have a cylindrical surface, a first contact face 1210 and a second contact face 1220. The first contact face 1210 is parallel to the second contact face 1220.

The spacers 1200 make contact with the first electrode 1140 via the first contact face 1210.

The first height H1 of the spacers 1200 is larger than an allowable liquid crystal cell gap H2.

When the first height H1 is smaller than the allowable liquid crystal cell gap H2, the spacers 1200 may not maintain the distance between the first and second substrate 1100 and 1400.

When the first and second substrate 1100 and 1400 are assembled with each other, the spacers 1200 are compressed to have height that is substantially equal to H2.

An amount of compression of the spacers 1200 is determined by a factor such as a cross-sectional area of the spacers 1200, a count (or number) of the spacers 1200 and Young's modulus.

When Young's modulus is constant, the cross-sectional area and the count of spacers 1200 determine the amount of compression.

Firstly, the spacers 1200 are formed on the first electrode 1140 disposed on the black matrix 1120, such that the spacers 1200 one-to-one correspond to the color filter 1130 so as to determine to the cross-sectional area of the spacers 1200.

When the cross-sectional area is determined, the counter of the spacers may be adjusted according to the cross-sectional area.

In case that the cross-sectional area of the spacers 1200 is too small, the spacers 1200 are compressed so much that the spacers 1200 apply strong force to the first substrate 1100, so that the first electrode 1140, the spacers 1200 or the black matrix 1120 may be broken.

In case that the cross-sectional area of the spacers 1200 is to large, the spacers 1200 are compressed so little that the spacers 1200 are not compressed to the allowable liquid crystal cell gap H2. Thus, unfilled region is formed, which is not preferable. The unfilled region induces a critical deterioration of display quality.

Thus, determining the cross-sectional area and density of the spacers 1200 is important.

Hereinafter, a method of determining the cross-sectional area and density of the spacers 1200 is explained.

The cross-sectional area of the spacers 1200 is obtained by computer simulation. In order to obtain the cross-sectional area of the spacers 1200, a comparative liquid crystal display panel is used.

For example, the comparative liquid crystal display panel is a 17 inch super extended graphics array (SXGA) liquid crystal display panel. A size of a color filter of the comparative liquid crystal display panel is about 88 µm×264 µm. The size of a pixel is substantially equal to the size of the color filter. A width of the black matrix of the comparative liquid crystal display panel is in a range from about 12 µm to about 32 µm, so that the color filters are spaced apart from each other by about 12 µm-32 µm. In the comparative liquid crystal display panel, one spacer per twelve color filters is formed. The cross-sectional area of the spacer is about 500 µm².

The spacer has a cylindrical shape, so that a diameter of the spacer is about 25.2 µm. The Young's modulus of the spacer is about 487 N/mm².

When spacers are formed, such that the spacers one-to-one correspond to the color filter, a size of the spacer may be obtained by dividing 500 µm² by 12 to get about 41.7 µm².

That is, in case that the spacers are formed, such that a count of the spacers is equal to the number of the color filter, the area of the spacer is about 41.7 µm².

With the comparative liquid crystal display panel, the cross-sectional area of the spacer and the density of the objective liquid crystal display panel may be obtained.

In a macroscopic view, increasing the density of the spacer is similar to increasing the cross-sectional area of the spacer in effect.

A stiffness factor 'A' is introduced and defined by following Expression 4. The stiffness factor means a degree of transformation of the spacer.

$$A = a \times B \times C \qquad \text{Expression 4}$$

wherein 'A' denotes the stiffness factor, 'a' denotes a compensating constant defined by (area of color filter of comparative liquid crystal display panel)/(area of color filter of objective liquid crystal display panel), 'B' denotes the cross-sectional area of the spacer, and 'C' denotes the density of the spacer (or the count of the spacer per color filter).

For example, in case that one spacer is formed per twelve color filters, 'C' is 1/12.

Young's modulus of the spacer is about 487 N/mm².

In Expression 4, a value of B×C is preserved. That is, when 'B' increases, 'C' decreases. When 'C' increases, 'B' decreases. In other words, when the density of the spacers increases, the cross-sectional area of the spacers decreases.

Thus, the area of a total contact region between the spacers and the first or second substrate is fixed.

The compensating constant 'a' compensates a difference between the comparative liquid crystal display panel and the objective liquid crystal display panel. In case that the size of the objective liquid crystal display panel is substantially equal to the size of the comparative liquid crystal display panel, the compensating constant 'a' is equal to 1.

When the size of the objective liquid crystal display panel is larger than the size of the comparative liquid crystal display panel, the compensating constant 'a' is smaller than 1. When the size of the objective liquid crystal display panel is smaller than the size of the comparative liquid crystal display panel, the compensating constant 'a' is larger than 1.

As the compensating constant 'a' becomes smaller, the stiffness factor 'A' becomes smaller. As the compensating constant 'a' becomes larger, the stiffness factor 'A' becomes larger.

For example, in case that the area of the color filter of the objective liquid crystal display panel having 40 inch size is 227 μm×681 μm and the area of the comparative liquid crystal display panel is 88 μm×264 μm, the compensating constant $a_{40}$ is about 0.15 that is obtained by dividing (88×264) by (227×681).

Thus, the stiffness factor 'A' becomes smaller.

The cross-sectional area of the spacer 'B' may be determined by considering the distance between the color filters. A diameter of the spacer may be less than the distance between the color filters. In case that the diameter of the spacer is larger than the distance, the spacer invades the color filter, so that the display quality is lowered.

For example, when the distance between the color filters is in a range from about 30 μm to about 45 μm, a diameter 'D' of the spacer may be 35 μm that is less than 45 μm preferably. Then, the cross-sectional area of the spacer 'B' is about 800 μm² that is obtained from $[\pi \times (D/2)^2]$.

Thus, when the stiffness factor 'A', the compensating constant 'a' and the cross-sectional area 'B' is determined, the density 'D' of the spacer may be obtained from Expression 4. The stiffness factor 'A' is determined, such that the first and second substrates are not broken and the unfilled region is not formed.

Hereinafter, a method of determining the stiffness factor 'A' is explained.

Figure 28A:
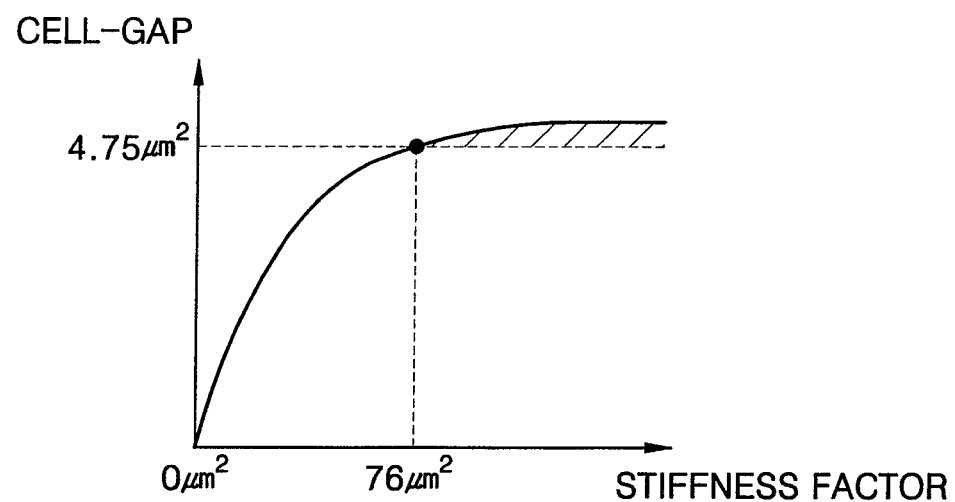
FIG. 28A is a graph showing a relation between a cell gap and a stiffness factor, when a Young's modulus is about 487 N/mm$^2$.

FIG. 28A is a graph showing a relation between a cell gap and a stiffness factor, when a Young's modulus is about 487 N/mm².

The graph was obtained by simulation.

Referring to FIG. 28A, when a stiffness factor is in a range from about 0 μm² to about 30 μm², a cell gap increases rapidly. When the stiffness factor is larger than about 30 μm², the cell gap increases slowly.

A liquid crystal display apparatus of twisted nematic liquid crystal, a thickness of the liquid crystal layer is about 4.65 μm. When the thickness of the liquid crystal layer is over 4.75 μm, the liquid crystal display apparatus is treated as a malproduct due to poor display quality.

Thus, an allowable maximal cell gap is 4.75 μm. The stiffness factor corresponding to the allowable maximal cell gap is about 76 μm².

Thus, the cell gap is designed, such that the stiffness factor is less than 76 μm².

In a vertical alignment mode, the maximum allowable cell gap may be obtained by the graph of FIG. 28A.

When the stiffness factor is over about 76 μm², the spacer is too stiff. Thus, the spacer is seldom compressed, when the first and second substrate are assembled together. When the spacer is not compressed until the spacer has a height that is substantially equal to the allowable liquid crystal cell gap H2 of FIG. 27, a liquid crystal display panel includes an unfilled region. Thus, the display quality is lowered. The unfilled region corresponds to a hatched region.

According to the graph of FIG. 28A, when the stiffness factor is less than about 76 μm², the liquid crystal display device includes no unfilled region.

As a compression ratio increases, a compressive stress applying to the first and second substrate increases.

Figure 28B:
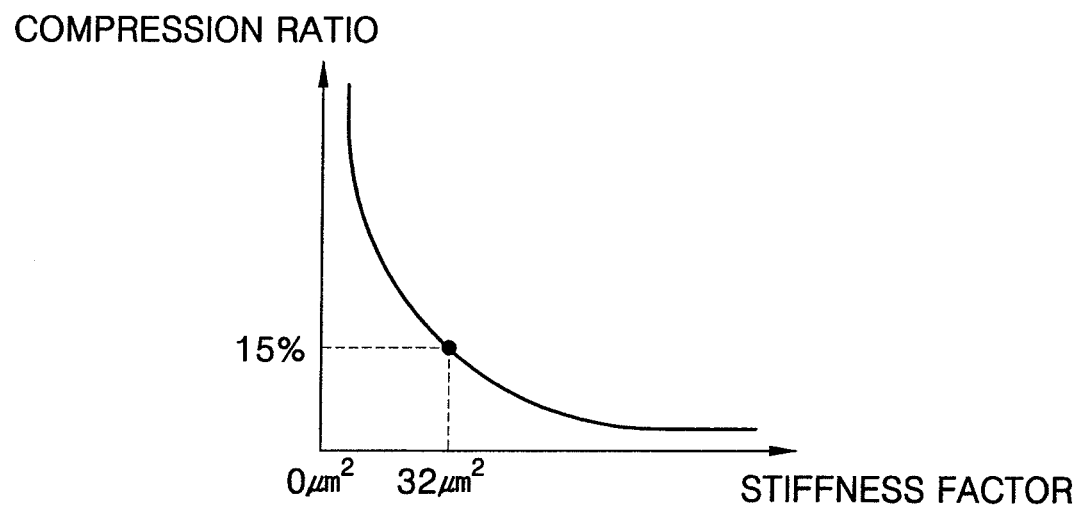
FIG. 28B is a graph showing a relation between a compression ratio and a stiffness factor, when a Young's modulus is about 487 N/mm$^2$.

FIG. 28B is a graph showing a relation between a compression ratio and a stiffness factor, when a Young's modulus is about 487 N/mm².

Referring to FIG. 28B, as a stiffness factor decreases, a compression ratio increases. As the stiffness factor increases, the compression ratio decreases.

When the compression ratio is over about 15%, a spacer may damage the first and second substrates, in case of Young's modulus of the spacer is about 487 N/mm².

The compression ratio of 15% means that a spacer having 100 μm height is compressed to have 85 μm height for example.

The stiffness factor corresponding to the compression ratio of 15% is about 32 μm². The stiffness factor is inversely proportional to the compression ration as shown in FIG. 28B. Thus, when the compression ratio less than about 15%, the stiffness factor is more than about 32 μm².

As a result of FIGS. 28A and 28B, in case of a Young's modulus of the spacer is about 487 N/mm², the stiffness factor 'A' of Expression 4, is in a range from about 32 μm² to about 76 μm².

The range of the stiffness factor may be adjusted according to the Young's modulus of the spacer.

Figure 29A:
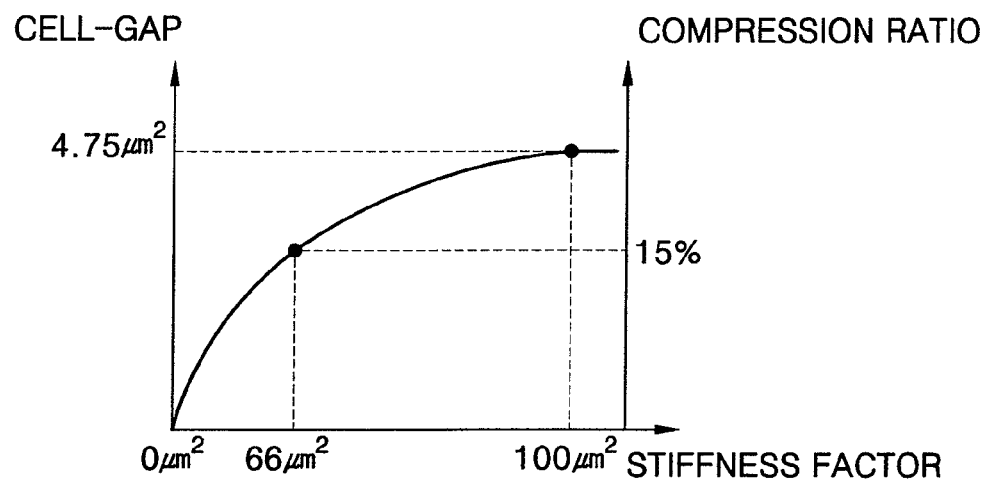
FIG. 29A is a graph showing a relation between a cell gap (or a compression ratio) and a stiffness factor, when a Young's modulus is about 243.5 N/mm$^2$.

FIG. 29A is a graph showing a relation between a cell gap (or a compression ratio) and a stiffness factor, when Young's modulus is about 243.5 N/mm².

Referring to FIG. 29A, when Young's modulus is lowered from about 487 N/mm² to about 243.5 N/mm², the stiffness factor corresponding to an upper limit of region where no unfilled region is formed increases from about 76 μm² to about 120 μm².

The stiffness factor corresponding to the compression ratio of 15%, that is corresponding to a lower limit of region where the first and second substrates are not damaged increases from about 32 μm² to about 66 μm².

Thus, the spacer is designed, such that the stiffness factor is in a range from about 66 μm² to about 120 μm², in case that the Young's modulus is about 243.5 N/mm².

Comparing with the previous result, when Young's modulus becomes a half, an upper limit and a lower limit of the range of the stiffness factor become double respectively.

Figure 29B:
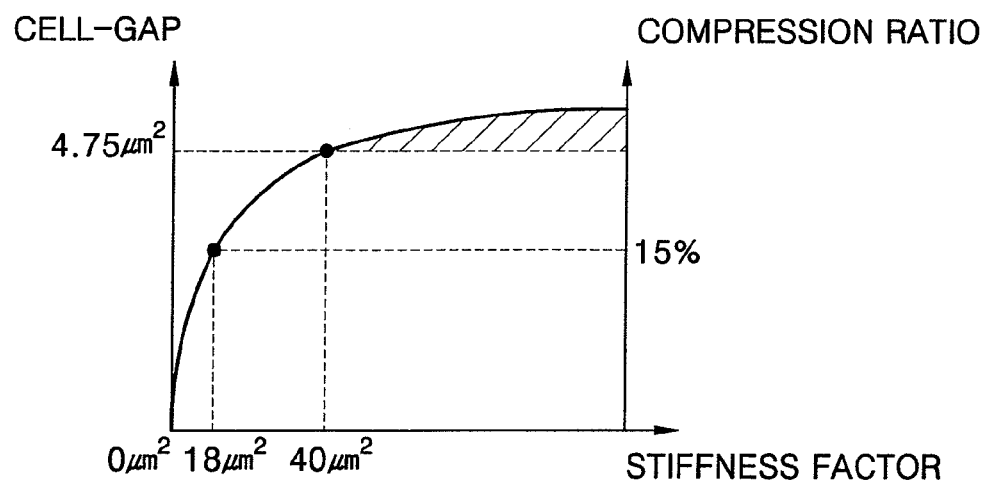
FIG. 29B is a graph showing a relation between a cell gap (or a compression ratio) and a stiffness factor, when a Young's modulus is about 974 N/mm$^2$.

FIG. 29B is a graph showing a relation between a cell gap (or a compression ratio) and a stiffness factor, when Young's modulus is about 974 N/mm².

Referring to FIG. 29B, when Young's modulus is increased from about 487 N/mm² to about 974 N/mm², the stiffness factor corresponding to an upper limit of region where no unfilled region is formed decreases from about 76 μm² to about 40 μm².

The stiffness factor corresponding to the compression ratio of 15%, that is corresponding to a lower limit of region where the first and second substrates are not damaged decreases from about 32 μm² to about 18 μm².

Thus, the spacer is designed, such that the stiffness factor is in a range from about 18 μm² to about 40 μm², in case that Young's modulus is about 974 N/mm².

Comparing with the previous result, when the Young's modulus becomes a double, an upper limit and a lower limit of the range of the stiffness factor become a half respectively.

In short, the range of the stiffness factor is changed, when Young's modulus is changed.

Thus, in order to compensate the difference of Young's modulus, the range of the stiffness factor is adjusted as the following Expression 5.

$$(Ycom/Yob) \times 32 \; \mu m^2 \leq A \leq (Ycom/Yob) \times 76 \; \mu m^2 \quad \text{Expression 5}$$

wherein Ycom denotes Young's modulus of a comparative liquid crystal display panel, and Yob denotes Young's modulus of an objective liquid crystal display panel.

In Expression 5, Young's modulus of the comparative liquid crystal display panel Ycom is 487 N/mm².

Referring again to FIG. 27, the spacers 1200 are formed on the first electrode 1140 by the stiffness factor, such that the spacers 1200 deviate from the color filters 1132, 1134 and 1136.

The spacer 1200 has a first height H1.

The liquid crystal is dropped and filled to have the depth corresponding to the allowable liquid crystal cell gap H2.

Figure 30:
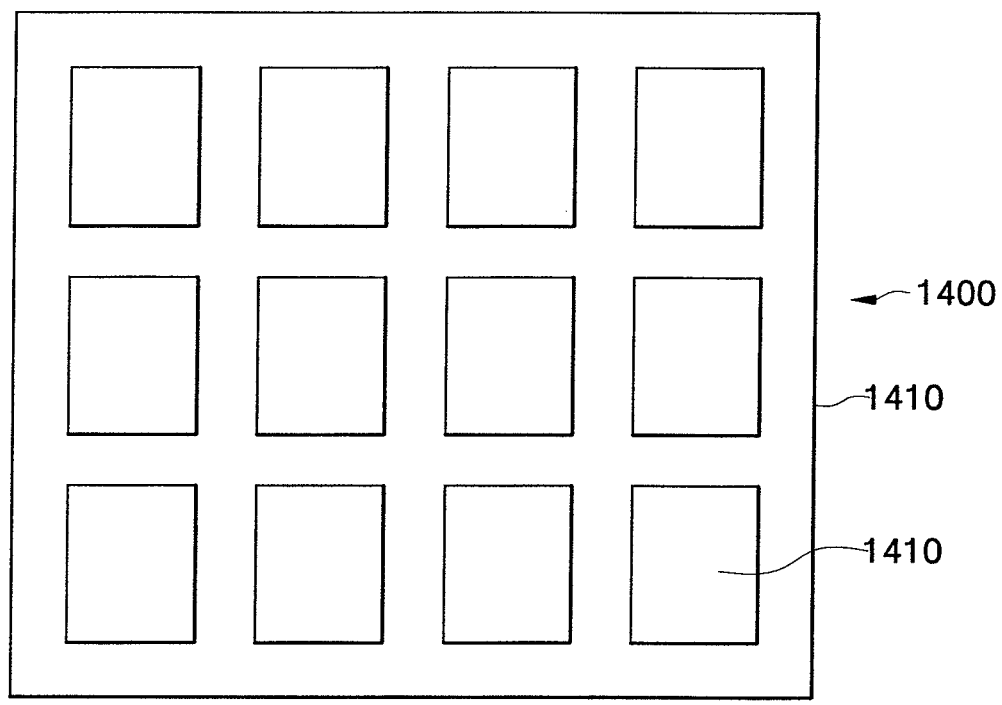
FIG. 30 is a schematic plan view showing a thin film transistor substrate according to a seventh exemplary embodiment of the present invention.

FIG. 30 is a schematic plan view showing a thin film transistor substrate according to a seventh exemplary embodiment of the present invention.

Referring to FIG. 30, a second substrate 1400 includes a transparent substrate 1410, a thin film transistor (not shown) and a second electrode 1420.

The second electrode 1420 faces the color filter 1130 of the first substrate 1100 of FIG. 27.

The second electrode 1420 is electrically connected with the thin film transistor.

The first substrate 1100 and the second substrate 1400 are assembled together, such that the second electrode 1420 of the second substrate 1400 faces the color filter 1130 of the first substrate 1100.

Embodiment 8

In order to manufacture a liquid crystal display apparatus of FIG. 25 according to an exemplary embodiment 8, a first height H1, a cross-sectional area and a density of the spacer 1200 are calculated. Then, the spacers 1200 are formed on a first substrate 1100 according to the calculated first height H1, cross-sectional area and density. The liquid crystal 1300 is provided to the first substrate 1100. The first substrate 1100 and the second substrate 1400 are assembled together.

The first height H1 of the spacers 1200 is higher than the allowable liquid crystal cell gap H2. The cross-sectional area of the spacers 1200 is designed, such that the spacers 1200 having the first height H2 may be compressed to a height corresponding to the allowable liquid crystal cell gap H2.

The cross-sectional area and the density of the spacers 1200 may be obtained from Expressions 4 and 5.

When the cross-sectional area and the density of the spacers 1200 may be obtained, the first substrate 1100 is formed.

FIGS. 31A to 31J are a schematic view showing a process of manufacturing a color filter substrate according to an eighth exemplary embodiment of the present invention.

Figure 31A:
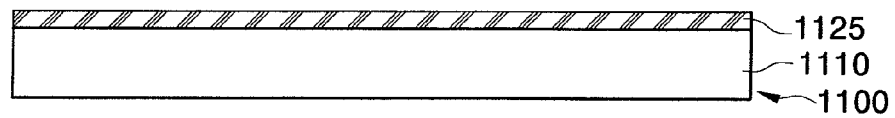
FIG. 31A is a schematic cross-sectional view showing a chromium thin film formed on a transparent substrate.

FIG. 31A is a schematic cross-sectional view showing a chromium thin film formed on a transparent substrate.

Referring to FIG. 31A, a chromium (Cr) thin film 1125 is coated on one face of a transparent substrate 1110. The chromium thin film 1125 may be coated on the transparent substrate 1110 by chemical vapor deposition (CVD) or a sputtering method.

Figure 31B:
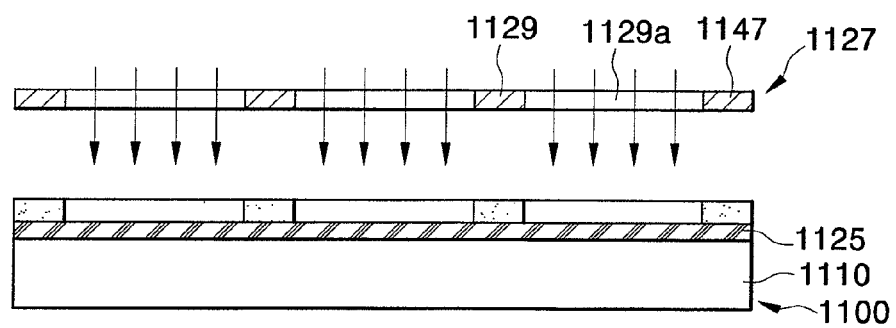
FIG. 31B is a schematic cross-sectional view showing a process of manufacturing a photoresist pattern.

FIG. 31B is a schematic cross-sectional view showing a process of manufacturing a photoresist pattern.

Referring to FIG. 31B, a photoresist is coated on a chromium thin film 1125 by a spin coating method or a slit coating method.

Then, a pattern mask 1127 is disposed over the transparent substrate 1110. The pattern mask 1127 has a lattice shape.

Figure 31C:
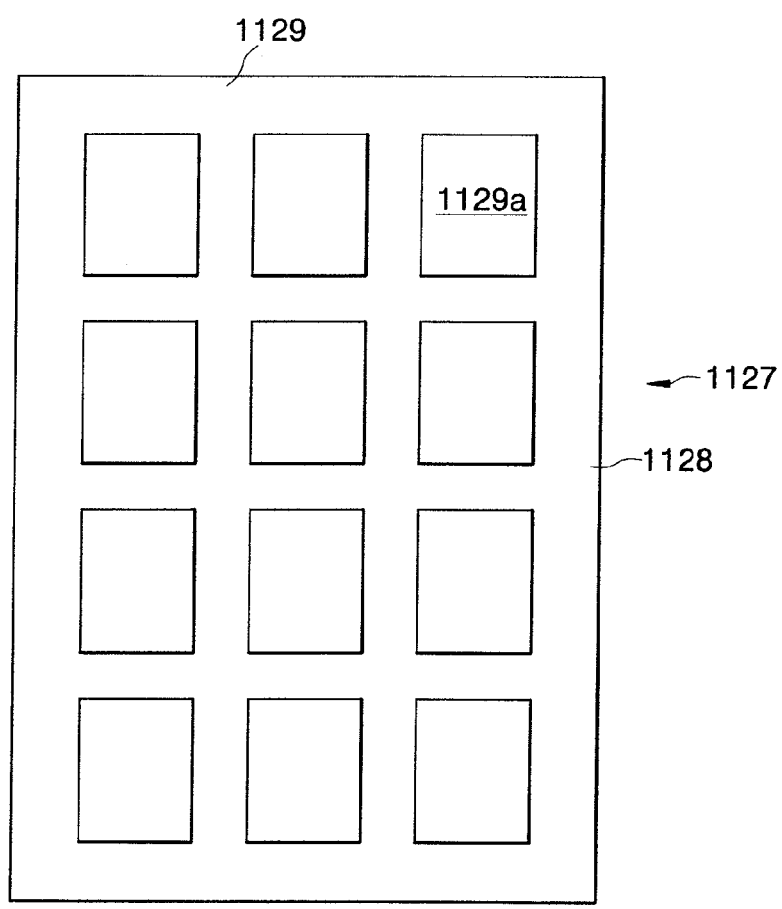
FIG. 31C is a plan view showing a pattern mask of FIG. 32B.

FIG. 31C is a plan view showing a pattern mask of FIG. 32B.

Referring to FIG. 31C, the pattern mask 1127 includes a glass substrate 1128 and chromium pattern 1129. The glass substrate 1128 is transparent. The chromium pattern 1129 is coated on the glass substrate 1128. The chromium pattern 1129 includes openings 1129a.

A light is incident onto the pattern mask 1127. A first portion of the light that arrives at the openings 1129a passes through the pattern mask 1127 to arrive at the photoresist. A second portion of light that arrives at the chromium pattern 1129 is intercepted by the chromium pattern 1129.

The photoresist exposed to the light is removed. The photoresist that is not exposed to the light remains to form a photoresist pattern.

Figure 31D:
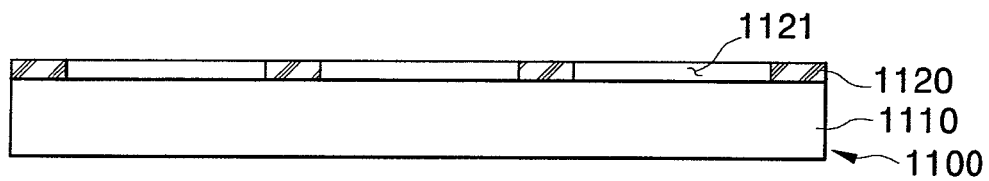
FIG. 31D is a schematic cross-sectional view showing a black matrix formed on a transparent substrate.

FIG. 31D is a schematic cross-sectional view showing a black matrix formed on a transparent substrate.

Referring to FIG. 31D, a first portion of the chromium is protected by the photoresist pattern. A second portion 1120 of the chromium is not protected by the photoresist pattern. The second portion 1121 of the chromium is etched, and the first portion of the chromium remains to form a black matrix. Hereinafter, a reference numeral 1120 corresponds to the black matrix, and a reference numeral 1121 corresponds to a groove formed by eliminating the second portion of the chromium.

The photoresist pattern on the black matrix is eliminated by ashing.

Figure 31E:
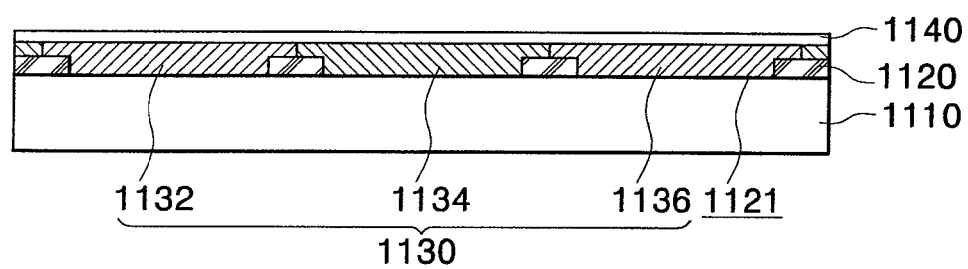
FIG. 31E is a schematic cross-sectional view showing a color filters formed on a transparent substrate, a first electrode formed on the color filters.

FIG. 31E is a schematic cross-sectional view showing a color filters formed on a transparent substrate, a first electrode formed on the color filters.

Referring to FIG. 31E, color filters 1130 are formed in the groove 1121, such that an edge of the color filters 1130 overlaps with the black matrix 1120.

The color filters 1130 includes a red color filter 1132, a green color filter 1134 and a blue color filter 1136.

A first electrode 1140 is formed on the color filters 1130. The first electrode 1140 may be formed by chemical vapor deposition (CVD). The first electrode 1140 includes indium tin oxide (ITO) or indium zinc oxide (IZO). The indium tin oxide (ITO) and indium zinc oxide (IZO) are transparent and electrically conductive.

Figure 31F:
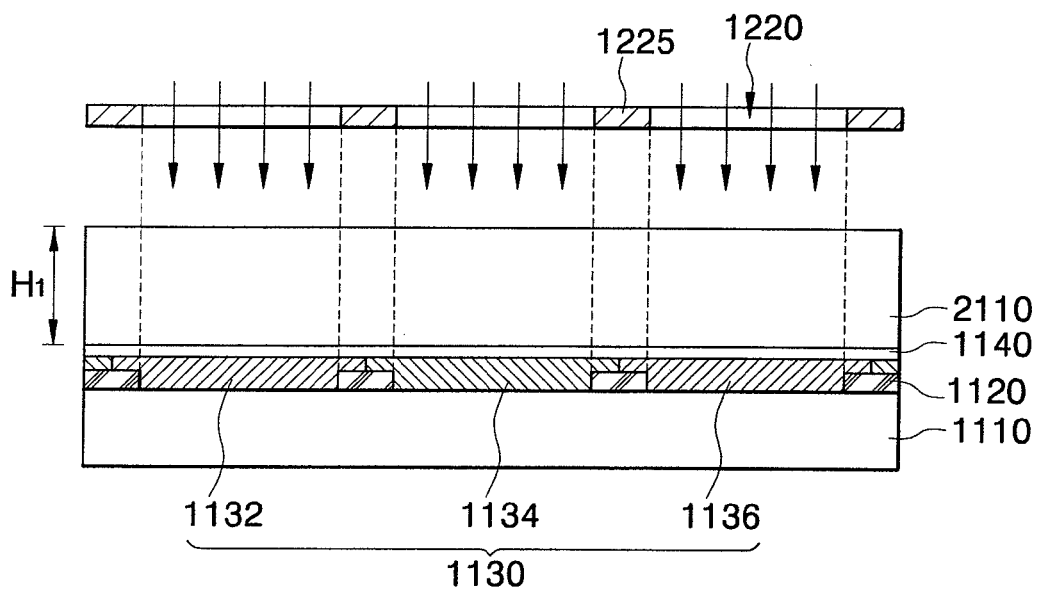
FIG. 31F is a schematic cross-sectional view showing a process of forming spacers on a first electrode.

FIG. 31F is a schematic cross-sectional view showing a process of forming spacers on a first electrode.

Referring to FIG. 31F, a thin film 1210 is formed on the first electrode 1210, such that a thickness of the thin film 1210 is about H1 of FIG. 27. The thin film 1210 may be formed by spin coating method or slit coating method.

Young's modulus of the thin film 1210 determines Young's modulus of the spacer.

The thin film 1210 is photosensitive.

A pattern mask 1220 is disposed over the thin film 1210.

Figure 31G:
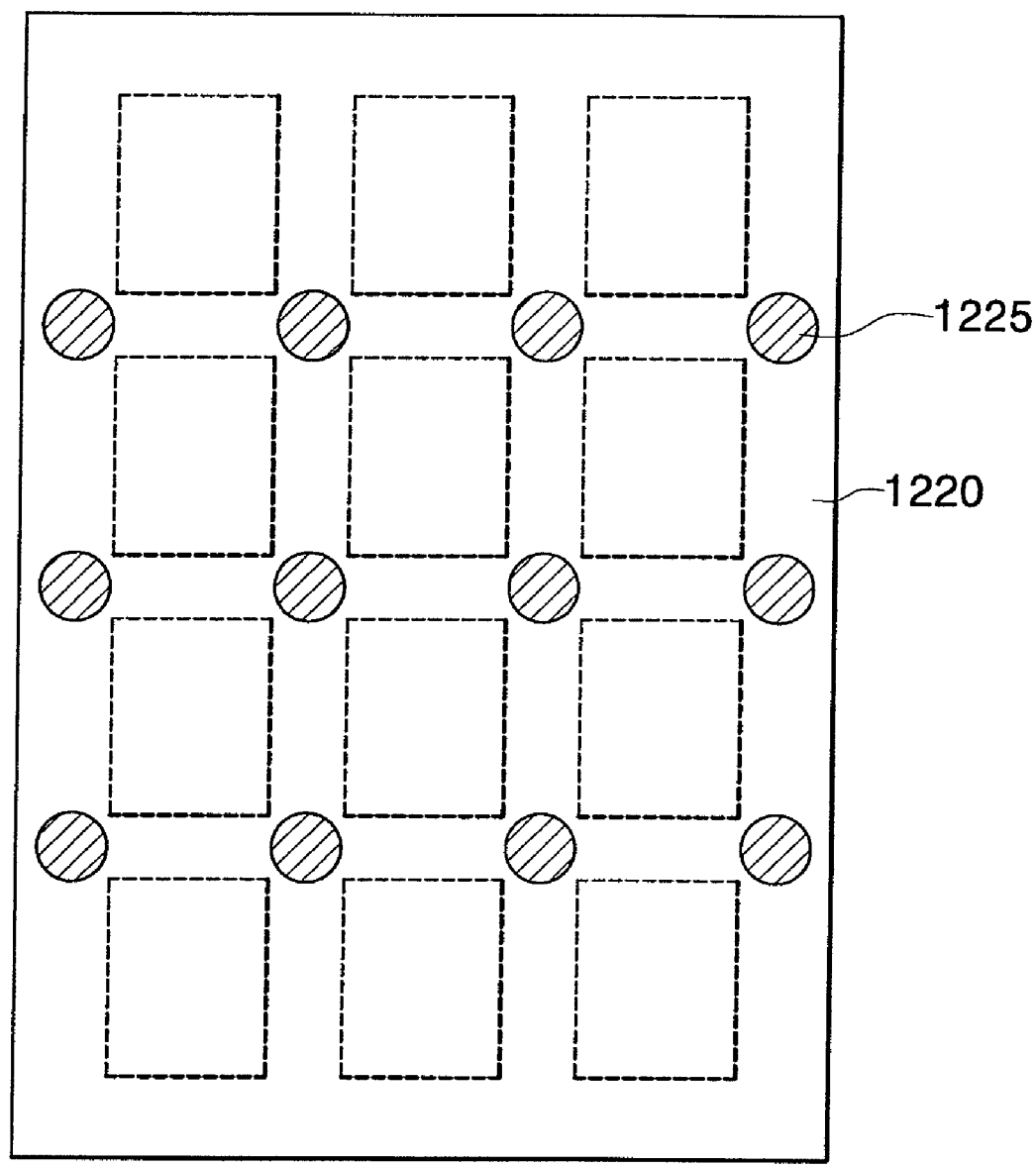
FIG. 31G is a plan view of a pattern mask of FIG. 31F.

FIG. 31G is a plan view of a pattern mask of FIG. 31F.

Referring to FIG. 31G, the pattern mask 1220 includes openings 1225 for forming spacers. An area of the openings 1225 is substantially equal to a cross-sectional area of the spacers.

A first portion of the thin film is exposed to a light, and a second portion of the thin film is not exposed to the light. The first portion of the thin film remains and the second portion of the thin film is eliminated, so that the spacers are formed.

Figure 31H:
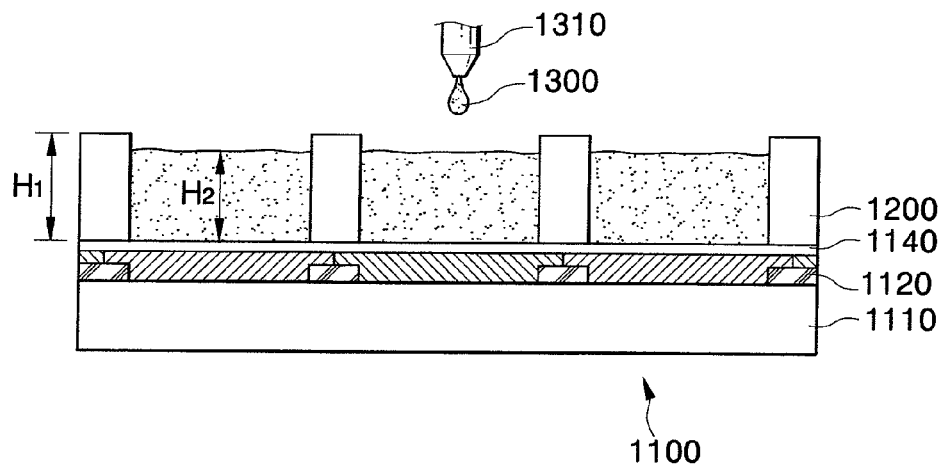
FIG. 31H is a schematic cross-sectional view showing a process of dropping liquid crystal.

FIG. 31H is a schematic cross-sectional view showing a process of dropping liquid crystal.

Referring to FIG. 31H, when spacers 1200 are formed on the first electrode 1140, a dispenser 1310 drops liquid crystal 1300, until a depth of the liquid crystal reaches to an allowable liquid crystal cell gap H2.

Figure 31I:
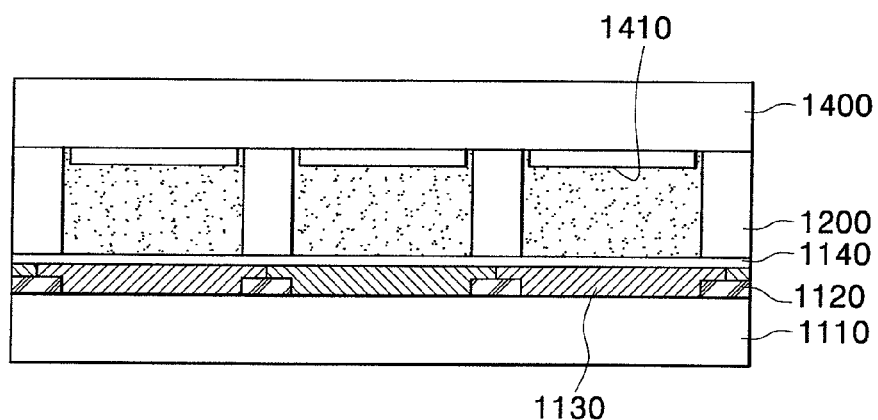
FIG. 31I is a cross-sectional view showing a thin film transistor and a color filter substrates assembled with each other to form a liquid crystal display panel.

FIG. 31I is a cross-sectional view showing a thin film transistor and a color filter substrates assembled with each other to form a liquid crystal display panel.

Referring to FIG. 31I, when liquid crystal is filled at a first substrate (or a color filter substrate) 1100, the first substrate 1100 is assembled with a second substrate (or a thin film transistor substrate) 1400. The second substrate 1400 includes a thin film transistor and a second electrode 1410.

The first and second substrates 1100 and 1400 are compressed, such that the spacers 1200 has a height that is substantially equal to the allowable liquid crystal cell gap H2 of FIG. 31H.

Figure 31J:
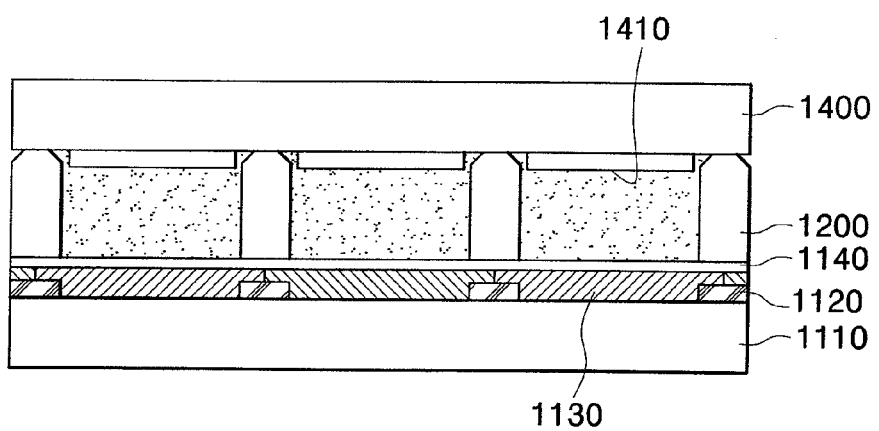
FIG. 31J is a cross-sectional view showing a liquid crystal display panel having spacers of which on end is tapered.

FIG. 31J is a cross-sectional view showing a liquid crystal display panel having spacers of which on end is tapered.

Referring to FIG. 31J, spacers 1200 may have a tapered end.

Having described the exemplary embodiments of the present invention and its advantages, it is noted that various changes, substitutions and alterations can be made herein without departing from the spirit and scope of the invention as defined by appended claims.

What is claimed is:

1. A method of manufacturing a liquid crystal display apparatus comprising:
    forming a first substrate having a display region;
    forming a second substrate;
    forming a plurality of spacers on the display region of the first substrate, compression ratios of the spacers gradually increasing as advancing in a direction from a center to left and right edges of the display region, wherein the compression ratio of each spacer is a height reduction of the spacer by compression divided by an original height of the spacer;
    forming a fence on the first substrate, such that the fence surrounds the display region to form a space defined by the first substrate and the fence;
    dropping liquid crystal in the space to fill the space; and
    assembling the first and second substrates with each other.

2. The method of claim 1, wherein the spacers are patterned by a photolithography process.

3. The method of claim 2, wherein the photolithography process is executed, such that an amount of light decreases in said direction.

4. The method of claim 1, wherein the substrate comprises a plurality of pixel electrodes, the spacers being formed such that the spacers deviate from the pixel electrodes.

5. The method of claim 1, wherein the substrate comprises a black matrix and a common electrode, the spacers being formed such that the spacers are disposed over the black matrix.

6. The method of claim 1, wherein the spacers are tapered, a side face of the spacer and the transparent substrate forming a tapered angle, the tapered angle of the spacers gradually increasing in said direction, a product of an upper diameter and a lower diameter of the spacers decreasing in said direction.

7. The method of claim 6, wherein a difference of the tapered angle of the spacer disposed at the edge and the tapered angle of the spacer disposed at the center is no more than about 40°.

8. The method of claim 1, wherein the spacers are tapered, such that a tapered angle is constant, a side face of the spacer and the transparent substrate forming the tapered angle, a diameter of the spacers decreasing in said direction.

9. The method of claim 1, wherein a polymer linking density of the spacers decreases in said direction.

10. The method of claim 1, wherein Young's modulus of the spacers decreases in said direction.

11. The method of claim 1, wherein an amount of compression of the spacer disposed at the center is smaller than the amount of compression of the spacer disposed at the edge by about 0.1 μm.

12. The method of claim 1, wherein the spacers are formed, such that a condition $1 < A_{center}/A_{edge} < 1 + 0.1 A_{center}$ is satisfied, where $A_{center}$ denotes a cross-sectional area of the spacer disposed at the center and $A_{edge}$ denotes a cross-sectional area of the spacer disposed at the edge.

13. The method of claim 1, wherein the spacer disposed at the center has a column shape, the spacers being tapered in said direction.

14. The method of claim 13, wherein the column has a cylindrical shape, a rectangular prism shape or a hexagonal prism shape.

15. The method of claim 14, wherein the column is tapered to form a truncated cone shape, a frustum of rectangular pyramid shape or a frustum of hexagonal pyramid shape.

* * * * *